US008108597B2

(12) United States Patent
Amano et al.

(10) Patent No.: US 8,108,597 B2
(45) Date of Patent: *Jan. 31, 2012

(54) STORAGE CONTROL METHOD AND SYSTEM FOR PERFORMING BACKUP AND/OR RESTORATION

(75) Inventors: Takashi Amano, Yokohama (JP); Yoichi Mizuno, Yokohama (JP)

(73) Assignees: Hitachi, Ltd., Tokyo (JP); Hitachi Computer Peripherals Co., Ltd., Tokyo (JP)

( * ) Notice: Subject to any disclaimer, the term of this patent is extended or adjusted under 35 U.S.C. 154(b) by 615 days.

This patent is subject to a terminal disclaimer.

(21) Appl. No.: 12/289,668

(22) Filed: Oct. 31, 2008

(65) Prior Publication Data

US 2009/0077311 A1 Mar. 19, 2009

Related U.S. Application Data

(63) Continuation of application No. 11/514,829, filed on Sep. 5, 2006, now Pat. No. 7,461,201.

(30) Foreign Application Priority Data

May 15, 2006 (JP) ................................ 2006-135776

(51) Int. Cl.
G06F 13/00 (2006.01)
(52) U.S. Cl. .......................... 711/111; 711/154; 711/162
(58) Field of Classification Search .................. 711/111, 711/154, 162
See application file for complete search history.

(56) References Cited

U.S. PATENT DOCUMENTS

| 7,308,528 | B2 | 12/2007 | Kitamura et al. |
| 7,461,201 | B2* | 12/2008 | Amano et al. ................ 711/111 |
| 2004/0034811 | A1 | 2/2004 | Trimmer et al. |
| 2005/0033911 | A1 | 2/2005 | Kitamura et al. |
| 2006/0064441 | A1 | 3/2006 | Yamamoto |
| 2009/0070530 | A1 | 3/2009 | Satoyama et al. |

FOREIGN PATENT DOCUMENTS

| JP | 2000-089917 | 3/2000 |
| JP | 2002-041345 | 7/2000 |
| JP | 2005-165694 | 6/2005 |
| JP | 2006-092124 | 4/2006 |

OTHER PUBLICATIONS

Office Action from Japanese Patent Office for Application No. 2006-135776 mailed Dec. 20, 2010 (7 pages).
Partial European Search Report dated May 5, 2009 in English.

* cited by examiner

Primary Examiner — Reba I Elmore
(74) Attorney, Agent, or Firm — Stites & Harbison PLLC; Juan Carlos A. Marquez, Esq.

(57) ABSTRACT

A second storage system (SS2) comprises a plurality of tapes, a first storage device capable of performing random access at a rate higher than the tapes, and a virtual storage device emulating the first storage device. A first storage system (SS1) comprises a second storage device and a third storage device that has the virtual storage device mapped therewith. The SS2 reserves a storage space on the first storage device and reads data from the tape corresponding to the virtual storage device into the storage space. The SS1 performs copying between the second storage device and third storage device and, in this process, sends a command for access generated in the third storage device to the virtual storage device. When receiving the Access Command corresponding to the virtual storage device, the SS2 accesses the storage space.

19 Claims, 26 Drawing Sheets

FIG.4

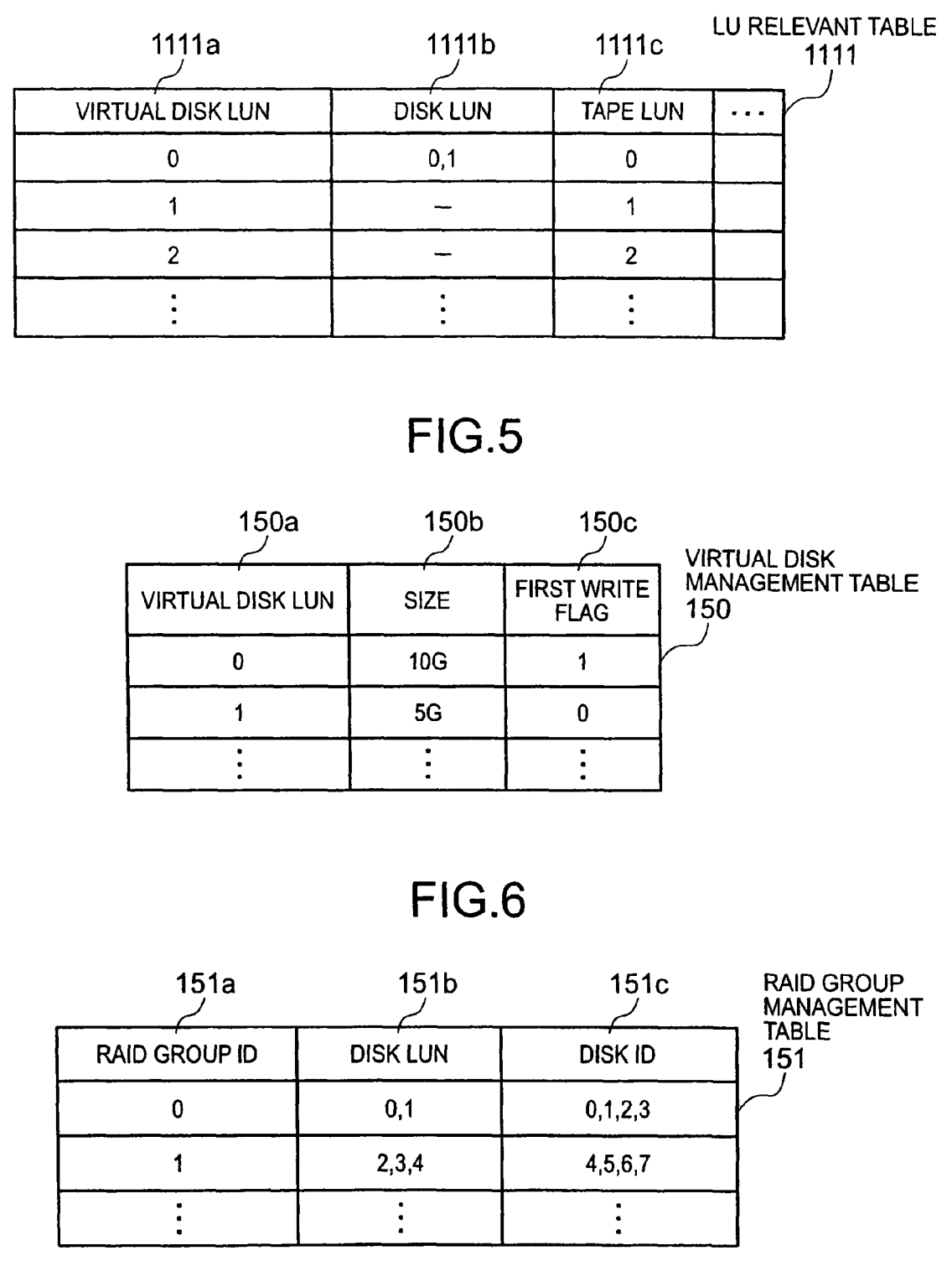

LU RELEVANT TABLE 1111

| VIRTUAL DISK LUN (1111a) | DISK LUN (1111b) | TAPE LUN (1111c) | ... |
|---|---|---|---|
| 0 | 0,1 | 0 | |
| 1 | – | 1 | |
| 2 | – | 2 | |
| ⋮ | ⋮ | ⋮ | |

FIG.5

VIRTUAL DISK MANAGEMENT TABLE 150

| VIRTUAL DISK LUN (150a) | SIZE (150b) | FIRST WRITE FLAG (150c) |
|---|---|---|
| 0 | 10G | 1 |
| 1 | 5G | 0 |
| ⋮ | ⋮ | ⋮ |

FIG.6

RAID GROUP MANAGEMENT TABLE 151

| RAID GROUP ID (151a) | DISK LUN (151b) | DISK ID (151c) |
|---|---|---|
| 0 | 0,1 | 0,1,2,3 |
| 1 | 2,3,4 | 4,5,6,7 |
| ⋮ | ⋮ | ⋮ |

FIG.7

DISK LU MANAGEMENT TABLE 154

| DISK LUN (154a) | SIZE (154b) | DISK ADDRESS (154c) | DISK LU STATUS (154d) | LAST TAPE LUN ADDRESS (154e) |
|---|---|---|---|---|
| 0 | 5G | 0:0-0:1000<br>1:0-1:1000 | IN USE | 0-0~0-2000 |
| 1 | 5G | ... | IN USE | 0-2000~0-4000 |
| ⋮ | ⋮ | ⋮ | ⋮ | ⋮ |

FIG.8

TAPE GROUP MANAGEMENT TABLE 152

| TAPE GROUP ID (152a) | TAPE LUN (152b) | TAPE ID (152c) |
|---|---|---|
| 0 | 0,1,2 | 000,001,002 |
| 1 | 3,4 | 003,004,005 |
| ⋮ | ⋮ | ⋮ |

FIG.9

TAPE LU MANAGEMENT TABLE 153

| TAPE LUN (153a) | SIZE (153b) | TAPE ADDRESS (153c) |
|---|---|---|
| 0 | 10G | 000-0~000-100 |
| 1 | 5G | 000-101~000-150 |
| ⋮ | ⋮ | ⋮ |

| VIRTUAL DISK LUN (1112a) | VIRTUAL DISK STATUS (1112b) |
|---|---|
| 0 | ACTIVE |
| 1 | INACTIVE |
| 2 | INACTIVE |
| ⋮ | ⋮ |

1112

| VIRTUAL DISK STATUS (1113a) | READ/WRITE COMMAND (1113b) | CONTROL COMMAND (1113c) |
|---|---|---|
| ACTIVE | POSSIBLE | POSSIBLE |
| ACTIVATE | IMPOSSIBLE | POSSIBLE |
| INACTIVE | IMPOSSIBLE | POSSIBLE |
| INACTIVATE | IMPOSSIBLE | POSSIBLE |
| ERROR | IMPOSSIBLE | POSSIBLE |

1113

FIG.19
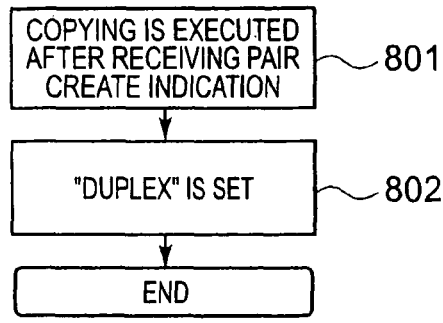
FIG.20
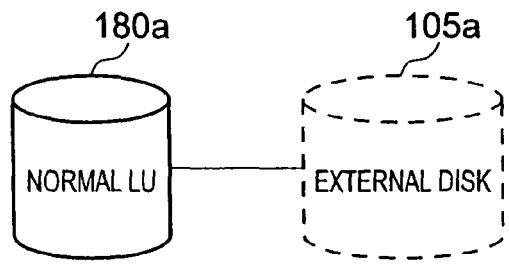
FIG.21
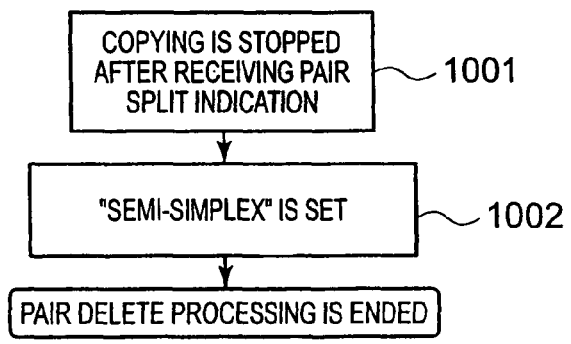
FIG.22
| PAIR ID | PRIMARY LUN | SECONDARY LUN | PAIR STATUS |
|---------|-------------|---------------|-------------|
| 0000 | 00 | 01 | DUPLEX |
| 0001 | 02 | 03 | SEMI-SIMPLEX |
1101　1102　1103　1104

FIG.27
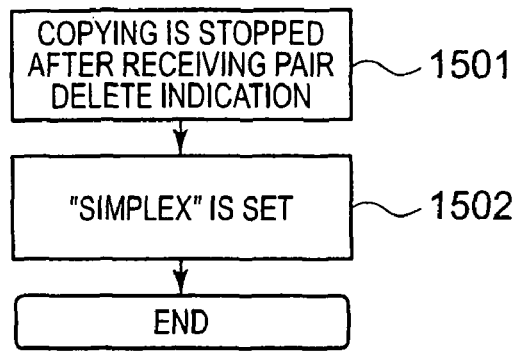
1501 — COPYING IS STOPPED AFTER RECEIVING PAIR DELETE INDICATION
1502 — "SIMPLEX" IS SET
END
FIG.28
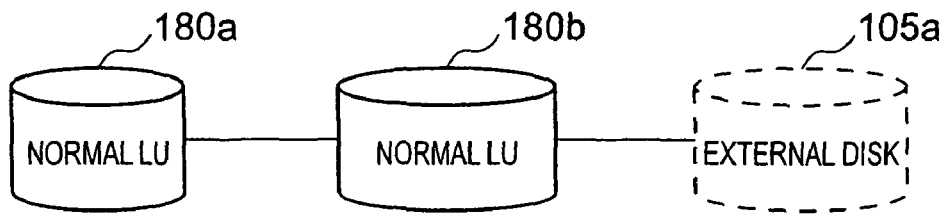
180a NORMAL LU — 180b NORMAL LU — 105a EXTERNAL DISK
FIG.29
| PAIR ID | PRIMARY LUN | SECONDARY LUN | PAIR STATUS |
|---------|-------------|---------------|-------------|
| 0000 | 00 | 01 | DUPLEX |
| 0001 | 01 | 02 | SEMI-SIMPLEX |
1101  1102  1103  1104
FIG.30
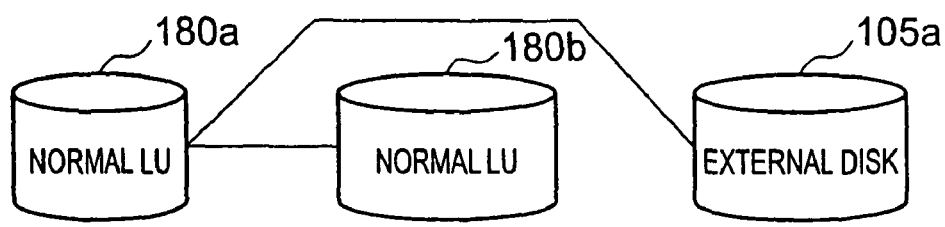
180a NORMAL LU — 180b NORMAL LU — 105a EXTERNAL DISK (VIRTUAL DISK?)

| MAPPING ID (2501) | EXTERNAL DISK LUN (2302) | VIRTUAL DISK LUN (401) | PRIMARY LUN (1102) | SECONDARY LUN (1103) | DATE (2502) |
|---|---|---|---|---|---|
| 0000 | 02 | 00 | 00 | 02 | 2006/01/01,01:00 |
| 0001 | 09 | 01 | 01 | 03 | 2006/01/02,01:00 |

STORAGE CONTROL METHOD AND SYSTEM FOR PERFORMING BACKUP AND/OR RESTORATION

CROSS-REFERENCE TO PRIOR APPLICATION

This application is a Continuation of U.S. application Ser. No. 11/514,829 filed Sep. 5, 2006 now U.S. Pat. No. 7,461, 201. Priority is claimed based on U.S. application Ser. No. 11/514,829 filed Sep. 5, 2006, which claims priority from Japanese Patent Application No. 2006-135776, filed on May 15, 2006, the entire disclosure of which is incorporated herein by reference.

BACKGROUND OF THE INVENTION

1. Field of the Invention

The present invention relates to a storage control technology for data backup and/or restoration.

2. Description of the Related Art

For example, Japanese Patent Application Laid-open No. 2002-41345 discloses a storage control method for connecting a computer, a disk storage, and a tape library device to a communication network called SAN (Storage Space Network) and performing backup of data stored in the disk storage to a tape library device with a server (referred to hereinbelow as a backup server) for backup processing.

With the above-described storage control method, data that are the backup object are backed up via a backup server. For this reason, the backup performance depends on the backup server, and when the processing performance of the backup server is poor, the time required for the backup increases.

Furthermore, a tape medium (simply referred to hereinbelow as "a tape") is apparently effectively as a backup destination of data. This is because a bit cost (cost per 1 bit) is lower than that of a disk device (for example, a hard disk). However, a tape often requires more time to read and write than a disk device. An especially long time is required in the case where the so-called random access is generated.

A similar problem also arises, for example, when the backed-up data are restored in a sequence inverted with respect to that of the backup, more specifically, in the case where the data are restored from the tape library device to the disk storage via the backup server.

SUMMARY OF THE INVENTION

Accordingly, it is an object of the present invention to provide a storage control technology that does not require a backup server and can perform backup and/or restoration at a high rate even when the backup destination and/or the restoration source is a tape.

Other objects of the present invention will become apparent from the following explanation.

The computer system in accordance with the present invention comprises a computer, a first storage system connected to the computer, and a second storage system connected to the first storage system. The second storage system comprises a plurality of tape media for storing data, a first storage device capable of performing random access that is an access with randomly different access destinations at a rate higher than the tape medium, a virtual storage device that emulates the first storage device, and a second controller for controlling access to the plurality of tape media and the first storage device. The computer comprises a computer control unit for sending a Copy Indication to the first storage system. The first storage system comprises a second storage device for storing data, a third storage device having the virtual storage device mapped therewith, and a first controller for controlling data access to the second storage device or the third storage device. The first controller receives the Copy Indication from the computer, performs data copying between the second storage device and the third storage device in response to the Copy Indication and, at this time, sends a Data Access Command indicating the virtual storage device for data access generated in the third storage device to the second storage system. The second controller reserves a storage space on the first storage device, reads data from an object tape medium, which is a tape medium corresponding to the virtual storage device, of the plurality of tape media, to the storage space, and when a Data Access Command relating to the virtual storage device is received from the first storage system, performs data access to the storage space, rather than to the object tape medium.

In the first implementation mode, the Copy Indication can be the indication of performing backup of the second storage device into the third storage device. The first controller can perform data copying from the second storage device to the third storage device in response to the Copy Indication and, at this time, can send a Write Command that indicates the virtual storage device for writing generated in the third storage device, to said second storage system. The second controller can receive the Write Command relating to the virtual storage device from the first storage system, perform writing into the storage space, rather than into the object tape medium, and when the writing is completed, can write data present on the storage space into the storage tape medium.

In the second implementation mode, the computer control unit in the first implementation mode can send a Split Indication to the first storage system. After the first controller receives the Split Indication from the computer, if there is an update in the second storage device, the first controller can manage a difference between the second storage device and the third storage device that originated due to the update and then, when the Copy Indication is received, can send to the second storage system the Write Command for writing only the managed difference into the third storage device.

In the third implementation mode, the computer control unit in the first implementation mode can send a Delete Indication to the first storage system. After the first controller receives the Delete Indication from the computer, even if there is an update in the second storage device, the first controller does not manage a difference between the second storage device and the third storage device that originated due to the update and then, when the Copy Indication is received, sends to the second storage system the Write Command for writing all the data located in the second storage device after the update to the third storage device.

In the fourth implementation mode, the Copy Indication can be the indication of restoring the third storage device into the second storage device. The first controller can perform data copying from the third storage device to the second storage device in response to the Copy Indication and, at this time, can send a Read Command that indicates the virtual storage device for reading from the third storage device to the second storage system, and can write data that are read out in response to the Read Command to the second storage device. The second controller can receive the Read Command relating to the virtual storage device from the first storage system, read data from the storage space, rather than from the object tape medium, and send the read-out data to the first storage system.

In the fifth implementation mode, the computer control unit in the fourth implementation mode can send a Split Indication to the first storage system. After the first controller receives the Split Indication from the computer, if there is an update in the second storage device, the first controller can manage a difference between the second storage device and the third storage device that originated due to the update and then, when the Copy Indication is received, can send to the second storage system the Read Command for reading only the managed difference into the second storage device.

In the sixth implementation mode, the computer control unit in the fourth implementation mode can send a Delete Indication to the first storage system. After the first controller receives the Delete Indication from the computer and, even if there is an update in the second storage device, the first controller does not manage a difference between the second storage device and the third storage device that originated due to the update and then, when the Copy Indication is received, sends to the second storage system the Read Command for reading all the data located in the third storage device into the second storage device. Incidentally, when no difference management is performed in this manner, the below-described sequential read (direct reading from the tape, rather than via a storage space) and/or sequential write (direct writing to the tape, rather than via a storage space) can be performed.

In the seventh implementation mode, the first storage system can comprise a plurality of storage devices including the second storage device and the third storage device. One of the plurality of storage devices and another storage device can be paired and the pair can be deleted in turn. The first controller can hold a pair management table where pair information relating to each pair is recorded. There is an upper limit for the number of pair information that is recorded in the pair management table. The computer can comprise a delete pair management table for recording delete pair information relating to the deleted pair.

In the eighth implementation mode, a plurality of third/virtual sets, each of which is a set of the third storage device and the virtual storage device, may be provided. Each third/virtual set can be deleted. The first controller holds a set management table for recording set information relating to the third/virtual set. There is an upper limit for the number of set information that is recorded in the set management table. The computer comprises a delete set management table for recording delete set information relating to the deleted third/virtual set.

In the ninth implementation mode, the virtual storage device is provided in a plurality. A tape LU that is a logical storage unit is mapped with each of the plurality of virtual storage devices. When, in a tape medium having the end of an object tape LU mapped with an object virtual storage device, there is present a tape LU different therefrom, the second controller can read data into the storage space from at least two tape LU including the object tape LU and the different tape LU. In a tape medium having the ends of the at least two tape LU, data of other tape LU are not present beyond the ends.

In the tenth implementation mode, the computer may be connected to the second storage system. The computer control unit can send a predetermined Prepare Indication corresponding to the virtual storage device to the second storage system. The second controller can receive the Prepare Indication from the computer and reserve the storage space in response to the Prepare Indication.

In the eleventh implementation mode, the first controller can send a predetermined Prepare Indication corresponding to the virtual storage device to the second storage system prior to the data copying. The second controller can receive the Prepare Indication from the first storage system and reserve the storage space in response to the Prepare Indication.

In the twelfth implementation mode, the computer may be connected to the second storage system. The computer control unit can send a predetermined End Indication corresponding to the virtual storage device to the second storage system. The second controller can receive the End Indication from the computer and write data located on the storage space into the object tape medium in response to the End Indication.

In the thirteenth implementation mode, the first controller can send a predetermined End Indication corresponding to the virtual storage device to the second storage system after the copying. The second controller can receive the End Indication from the first storage system and write data located on the storage space into the object tape medium in response to the End Indication.

In the fourteenth implementation mode, the second controller reserves a disk space that is released and releases the reserved disk space when a prescribed event occurs.

In the fifteenth implementation mode, when data that are a read object from the object tape medium are already present in the reserved disk space, the second controller does not read data from the object tape medium into the disk space.

In the sixteenth implementation mode, when data access indicating the virtual disk device is the first access, the second controller does not read data from the object tape medium into the disk space.

In the seventeenth implementation mode, at least two tape LU that are logical storage units may be prepared in the plurality of tape media. The virtual storage device may be provided in a plurality and each of the at least two tape LU may be mapped with each of the plurality of virtual storage devices. At least two storage LU that are logical storage units may be prepared in the first storage device. The second controller can accept a predetermined Prepare Indication corresponding to each virtual storage device from a higher-level device that is at least one of the computer and the first storage device and, when the Prepare Indication is received, can reserve at least one storage LU that is released with a storage capacity equal to or larger than an object tape LU that is mapped with the indicated virtual storage device that is indicated by the Prepare Indication, can read data from the object tape LU to the reserved at least one storage LU, can accept a predetermined End Indication corresponding to the indicated virtual storage device from the higher-level device, and when the End Indication is received, can write data located on the at least one reserved storage LU into the object tape LU, and can release the at least one storage LU.

The processing of the first and second controller can be implemented by units. The units can be termed means. The units can be also realized by hardware (for example, a circuit, a computer program, or a combination thereof (for example, one or a plurality of CPU for reading and executing a computer program). Computer programs can be read from a storage resource (for example a memory) provided in a computer machine. The programs can be installed on the storage resources via a storage medium such as CD-ROM or DVD (Digital Versatile Disk), or they can be downloaded via a communication network such as internet or a LAN.

At least one of the above-described first storage device and second storage device may be a disk-type storage device or a memory-type storage device. Examples of suitable disk-type storage devices include disks of various types such as hard disks, optical disks, and magnetooptical disks. Examples of memory-type storage devices include memories of various types such as semiconductor memory and flash memory.

BRIEF DESCRIPTION OF THE DRAWINGS

FIG. 4 illustrates an example of a LU relevant table;

FIG. 5 illustrates an example of a virtual disk management tape;

FIG. 6 illustrates an example of a RAID group management table;

FIG. 7 illustrates an example of a disk LU management table;

FIG. 8 illustrates an example of a tape group management table;

FIG. 9 illustrates an example of a tape LU management table;

FIG. 19 is a flowchart illustrating an example of a LU pair creation processing flow of a disk control program 205;

FIG. 20 shows a pair of a normal LU 180a and an external disk 105a;

FIG. 21 is a flowchart illustrating an example of a pair split processing flow of the disk control program 205;

FIG. 22 illustrates a configuration example of a disk control management table 206;

FIG. 27 is a flowchart illustrating an example of a pair delete processing flow of the disk control program 205;

FIG. 28 illustrates an example of a cascade of three or more LU;

FIG. 29 illustrates an example of the disk control management table 206 representing the cascade shown in FIG. 28;

FIG. 30 illustrates an example of a plurality of pairs with a common primary LU;

DESCRIPTION OF THE PREFERRED EMBODIMENTS

Several embodiments of the present invention will be described below with reference to the appended drawings.

Embodiment 1

Figure 1:
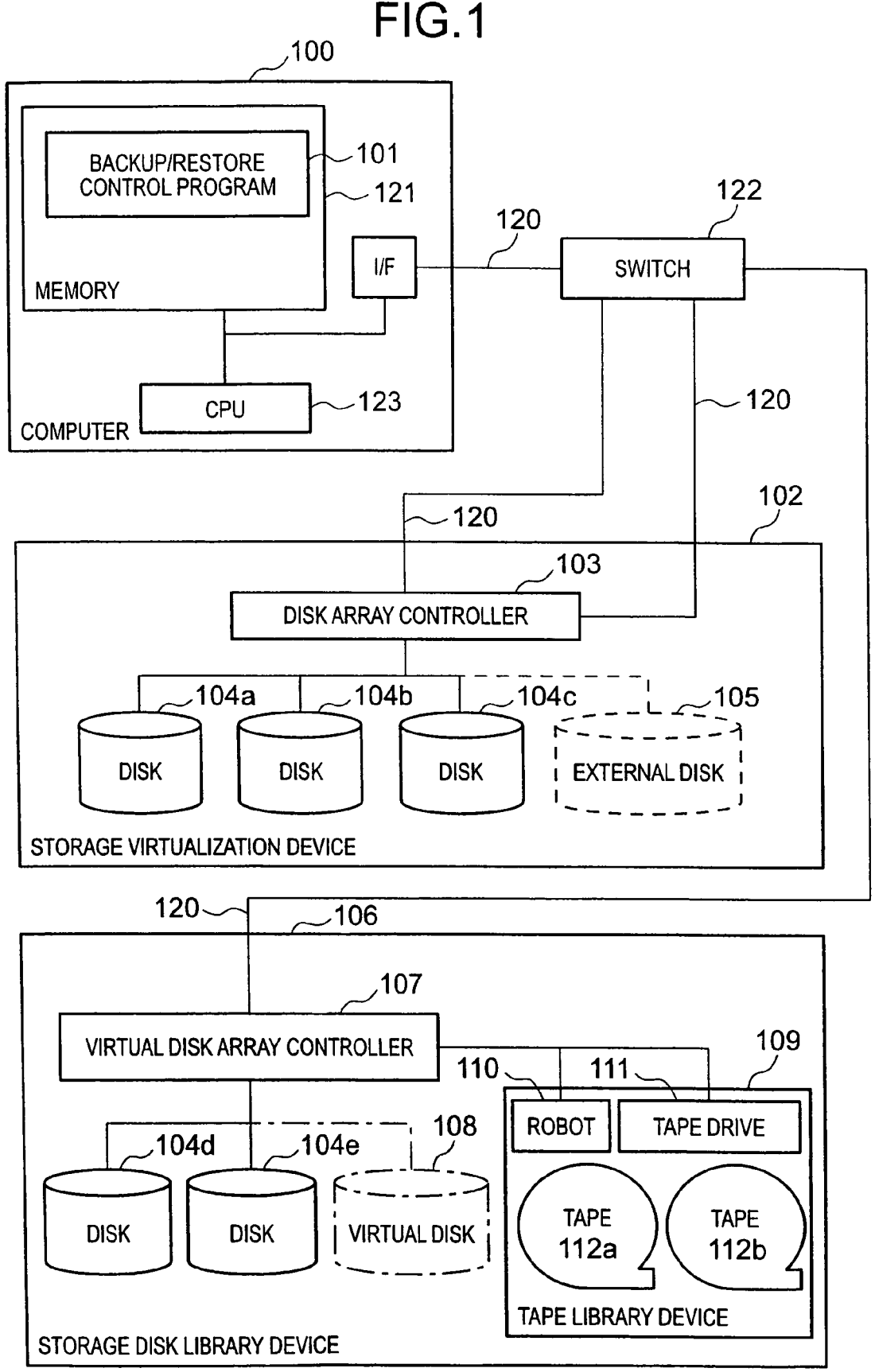
FIG. 1 illustrates a configuration example of the computer system of the first embodiment of the present invention.

FIG. 1 is a configuration example of a computer system of the first embodiment of the present invention.

A computer 100, a storage virtualization device 102, and a virtual disk library device 106 are connected to a fiber channel switch (abbreviated hereinbelow as "switch") 122. The computer 100 is connected to the storage virtualization device 102 via the switch 122 by using a fiber channel 120. The virtual disk library device 106 is connected to the storage virtualization device 102 via the switch 122 by using the fiber channel 102. The computer 100, storage virtualization device 102, and virtual disk library device 106 may be also connected to a communication network such as a LAN (Local Space Network) and may be connected by a special line.

The computer 100 comprises a backup/restore control program 101 for controlling a backup or a restore (referred to hereinbelow as backup/restore), a memory 121 for storing the backup/restore control program 101, and a CPU (Central Processing Unit) 123 for executing the backup/restore control program 101. The CPU 123 for executing the backup/restore control program 101 issues a variety of commands such as Activate Indication, an InActivate Indication, Pair Status Display Command, Pair Split Indication, Pair Delete Indication, Virtual Disk Status Display Command, Display Command, Delete Command, and Virtual Disk ID Display Command. When a program becomes a subject hereinbelow, it is assumed that the processing is actually carried out by the CPU executing the program.

The storage virtualization device 102 is a storage system having a function of providing storage resources located in other devices 106 present outside this device 102 as its own storage resources to the computer 100. The storage virtualization device 102 comprises a disk array controller 103 and a plurality of disks 104a, 104b, 104c. Each disk 104a, 104b, 104c is a disk-type storage device, more specifically, for example, a hard disk. The disk array controller 103 provides a plurality of logical volumes (can be also termed "logical units"; abbreviated hereinbelow as "LU"). Among a plurality of LU, there is a LU that is associated with any of the disks 104a, 104b, 104c and not mapped with an external LU, but there is also a LU that is mapped with the external LU. The former LU will be termed "normal LU" and the latter LU will be termed "external disk". The external disk 105 is mapped with a below-described virtual disk 108, and when data access to an external disk 105 is generated, data access is performed to the virtual disk 108 mapped with the external disk 105.

The virtual disk library device 106 is a storage system having a function of providing the virtual disk 108 that emulates a disk. The virtual disk library device 106 comprises a virtual disk array controller 107, at least one disk 104*d*, 104*e*, and a tape library 109. The tape library 109 comprises a plurality of tape media (referred to hereinbelow as "tape") 112*a*, 112*b* for saving data, a robot 110 for loading the tapes 112*a*, 112*b* in a tape drive 111, and taking the tapes 112*a*, 112*b* from the tape drive 111, and the tape drive 111 for reading/writing data to the loaded tapes 112*a*, 112*b*.

Figure 2:
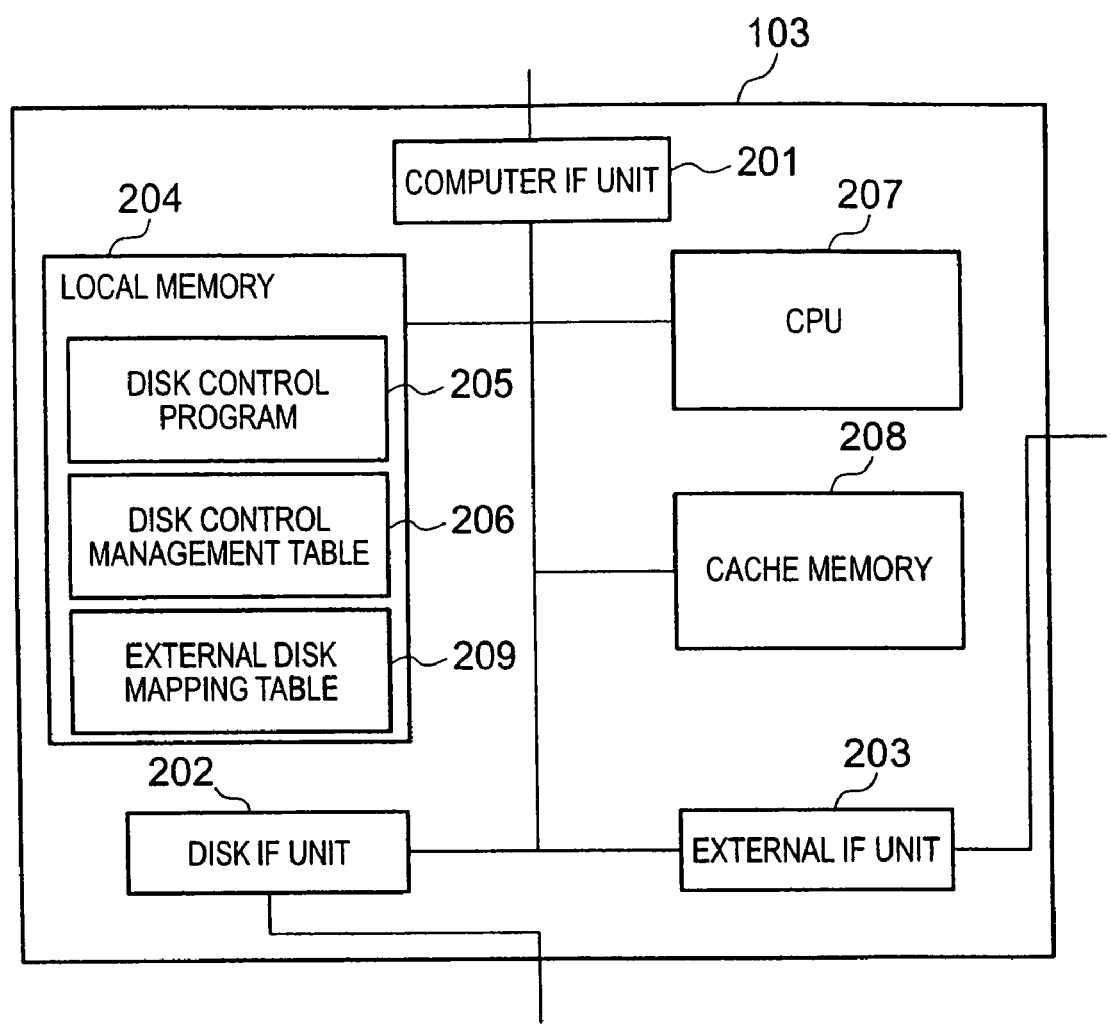
FIG. 2 illustrates a configuration example of a disk array controller 103 of a storage virtualization device 102.

FIG. 2 shows a configuration example of the disk array controller 103 of the storage virtualization device 102.

The disk array controller 103 comprises a computer interface (IF) unit 201 for connection to the computer 100, an external IF unit 203 for connection to the virtual disk library device 106, and a disk IF unit 202 for connection to the disk 104. Furthermore, the disk array controller 103 also comprises a local memory 204 for storing a disk control program 205, a disk control management table 206, and an external disk mapping table 209, a CPU 207 for reading the disk control program 205 from the local memory 204 and executing this program, and a cache memory 208 for temporarily saving the data that read from the disk 104 of data that will be written into the disk 104.

The disk control program 205 has a function of performing copying between the paired LU (for example, between normal LU, between a normal LU and an external disk 105, and between external disks 105). Furthermore, the disk control program 205 also has a function of performing a copy difference management between the paired LU. Moreover, the disk control program 205 has a function of providing a LU pair status to the computer 100 and an external disk virtualization function of virtualizing an external LU, which is a LU outside the storage virtualization device 102. In addition, the disk control program 205 provides a Delete Command for deleting pair information relating to a LU pair and a Display Command for displaying the information indicated by the disk control management table 206. With the "external disk virtualization function", the external LU can be displayed as a LU (external disk) 105 of the storage virtualization device 106 in the computer 100.

Figure 3:
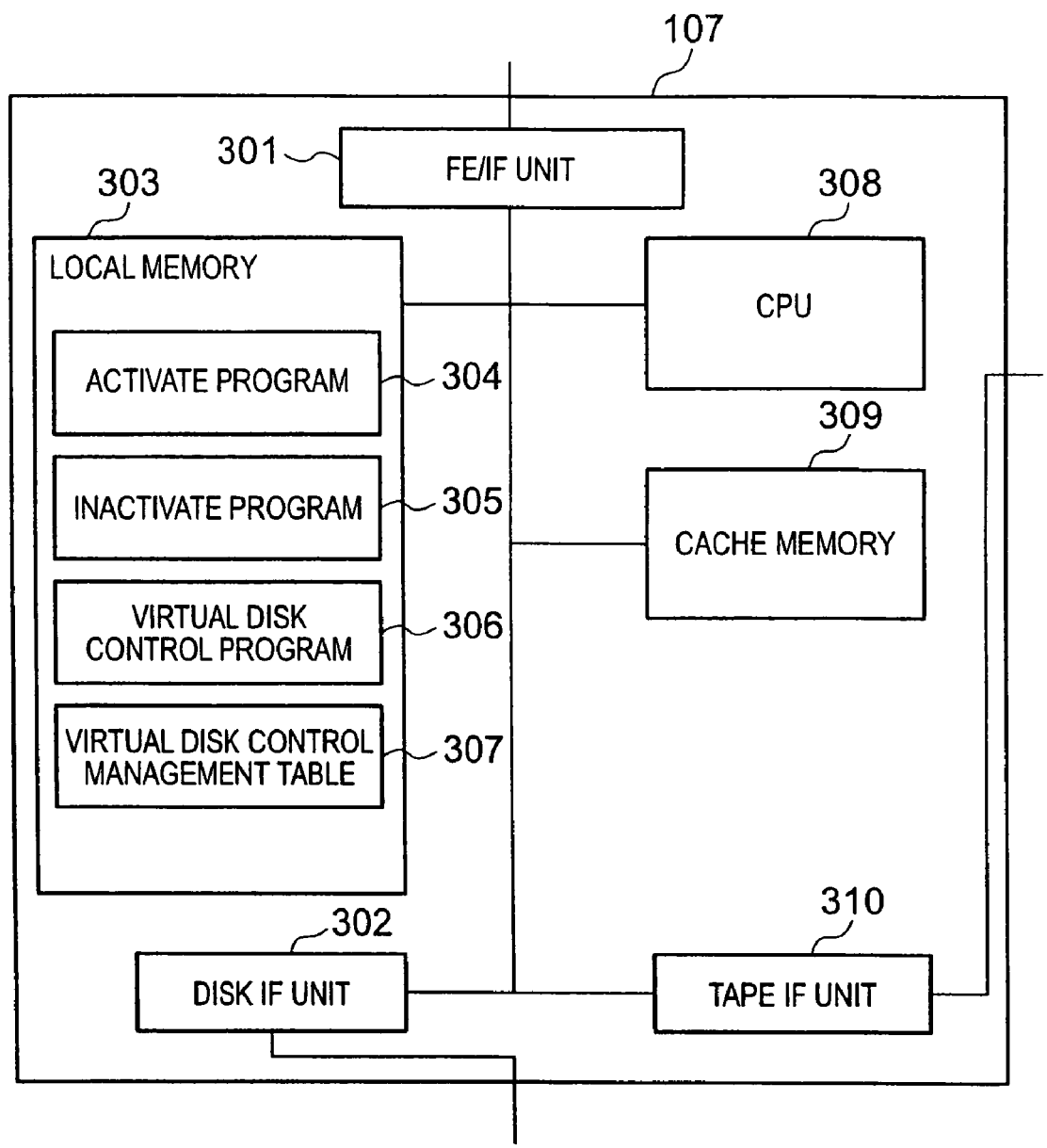
FIG. 3 illustrates a configuration example of a virtual disk array controller 107.

FIG. 3 shows a configuration example of the virtual disk array controller 107.

The virtual disk array controller 107 comprises a FE/IF unit 301 connected by a fiber channel 102 to the external IF unit 203 of the storage virtualization device 102 via the switch 120, a disk IF unit 302 connected to the disk 104, and a tape IF unit 310 connected to the robot 110 and tape drive 111 of the tape library unit 109. Furthermore, the virtual disk array controller 107 also comprises a local memory 303 for storing a computer program and the like, a CPU 308 for reading a computer program from the local memory 303 and executing the program, and a cache memory 208 for temporarily saving the data read from the tape 112 or disk 104 or data to be written into the disk 104 or tape 112. The local memory 303, for example, stores an Activate program 304, an InActivate program 305, a virtual disk control program 306, and a virtual disk control management table 307.

The virtual disk control program 306 has a virtual disk function of providing the above-described virtual disk 108 so as to handle the tape 112 as a disk, and a function of responding with a state of the virtual disk 108. Furthermore, the virtual disk control program 306 also provides a Virtual Disk LUN Display Command providing a virtual disk LUN, and a Virtual Disk Status Display Command providing a virtual disk status.

The relationship of logical volumes in the computer system of the above-described first embodiment will be described below.

Figure 38:
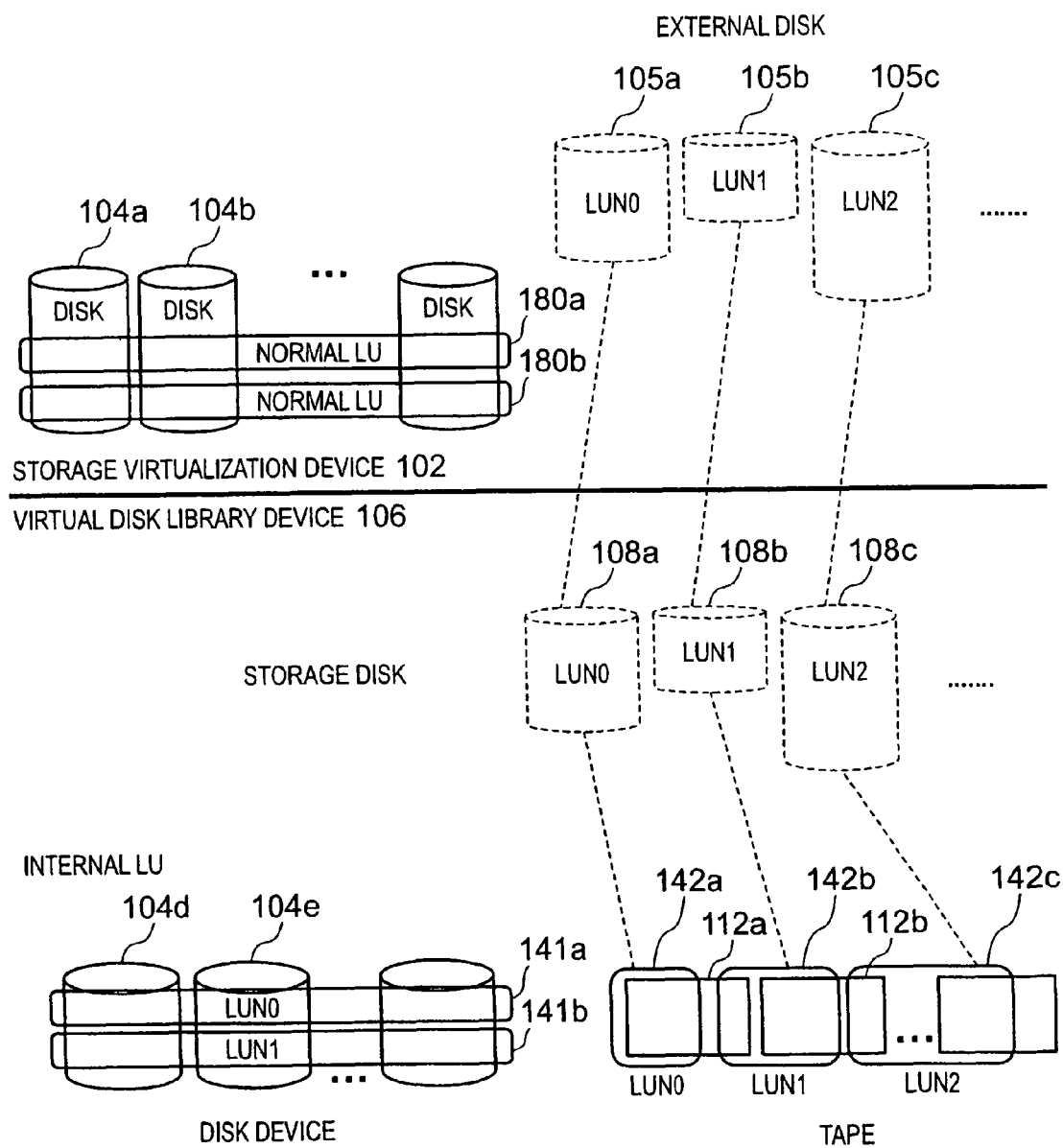
FIG. 38 illustrates schematically the allocation of logical volumes.

FIG. 38 illustrates schematically the allocation of logical volumes.

A disk space is usually recognized from the computer 100 in the units called logical volumes. In the storage virtualization device 102, there are normal LU 180*a*, 180*b* mapped with the disks 104*a*, 104*b* and the external disk 105 mapped with the virtual disk (a type of an external LU) 108. In the example shown in the figure, the external disks 105*a*, 105*b*, and 105*c* are mapped with the virtual disks 108*a*, 108*b*, and 108*c*, respectively. In the first embodiment, the normal LU 180 is a LU that can be data accessed by the computer 100. Furthermore, the normal LU 180 is paired with the external disk 105 during the back up and restore.

The virtual disk library device 106 comprises a library internal LU that is a logical volume representing a physical storage address, in addition to the virtual disk 108. The library internal LU can be a disk LU produced in the disk 104 and a tape LU produced in the tape 112. For example, a RAID group (sometimes it is termed a parity group or an array group) can be formed from a plurality of disks 104 and a plurality of disk LU 141 can be defined from one RAID group. Similarly, a tape group can be formed from a plurality of tapes 112 and a plurality of tape LU 142 can be defined from one tape group. A disk LUN (Logical Unit Number) and a tape LUN, which are inherent ID for management in the virtual disk library device 106, are allocated to the disk LU 141 and tape LU 142, respectively.

When a space for storing data is actually necessary, the virtual disk 108 is mapped with an internal LU representing a physical storage address in the device 106. A plurality of the internal LU can be also unified and mapped with one virtual disk 108. More specifically, for example, one or a plurality of tape LU 142 can be fixedly mapped with the virtual disk 108 and dynamically (or fixedly) mapped with the disk LU 141. The capacity of the virtual disk 108 and the storage capacity (a total storage capacity of all tape LU 142 when a plurality of tape LU 142 are mapped) of the tape LU 142 mapped therewith can be made identical. Furthermore, the disk LU 141 mapped dynamically with the virtual disk 108 can be used as a disk cache as referred to in the present embodiment. By performing dynamic rather than fixed mapping, the sufficient capacity can be provided with a disk LU with a total storage capacity less than the total storage capacity of a plurality of virtual disks 108 and, therefore, the total storage capacity (for example, the number of disks 104) of the installed disks 104 can be reduced.

Furthermore, in the case where the storage destination of data has changed from the internal LU 142*a* mapped with the virtual disk 108*a* to the internal LU 142*b*, for example, due to data migration, the internal LU to be mapped with the virtual disk 108*a* can be switched from the internal LU 142*a* to the internal LU 142*b*. As a result, when a data access (read or write) is generated with respect to the virtual disk 108*a*, the access can be made to the internal LU 142*b* of the migration destination.

The first embodiment will be overviewed hereinbelow by taking the configuration shown in FIG. 38 as an example. In the explanation below, the following assumptions will be made: the normal LU 180*a* is paired with the external disk 105a, the external disk 105a is mapped with the virtual disk 108a, and the tape LU 142a is mapped with the virtual disk 108a.

In the virtual disk library device 106, a plurality of various types of control commands are supported in addition to the commands of a data access system such as Read Command and Write Command. Examples of such control commands include an Activate Indication of preparing all the data located in the tape LU in the disk cache and an InActivate Indication for reflecting all the data located in the disk cache in the tape LU.

In the first embodiment, a backup processing will be performed. In the backup processing, the following (A) through (D) processing operations are preformed.

(A) The backup/restore control program 101 sends the Activate Indication that indicates the virtual disk 108a to the virtual disk library device 106 before the data of the normal LU 180a is backed up in the external disk 105a. The Activate program 304 performs the pre-processing in response to this Activate Indication. More specifically, in the pre-processing, the Activate program 304 allocates at least one disk LU 141 that has not been used (for example, that has not be allocated to any virtual disk 108) to the virtual disk 108a. The storage capacity (a total storage capacity in the case of a plurality of disk LU) of the at least one allocated disk LU is equal to or more than the storage capacity of the virtual disk 108a, but at least one of those disk LU (141a, 141b are assumed hereinbelow) is the disk cache as referred to in the present embodiment. In the pre-processing, the Activate program 304 reads all the data located in the tape LU 142a and writes all the data that are read out into the disk cache. As a result, all the data located in the tape LU 142a are prepared in the disk cache 141a, 141b. When the Activate program 304 starts pre-processing, it changes the status of the virtual disk 108a to "Activate", and when the program ends the pre-processing, it changes the status thereof to "Active".

(B) The backup/restore control program 101 monitors the status of the virtual disk 108a. When the status thereof could be detected as "Active", the backup/restore control program 101 considers the normal LU 180a as a primary LU and sends a Pair Create Indication of taking the external disk 105a as a secondary LU to the storage virtualization device 102. In response to this Pair Create Indication, the disk control program 205 creates a pair having the normal LU 180a as the primary LU and the external disk 105a as the secondary LU and copies the data stored by the normal LU 180a to the external disk 105a, thereby making the contents of the normal LU 180a identical to the contents of the external disk 105a. The data that is a copy object may be the entire data of the normal LU 180a or may be the data representing the difference between the normal LU 180a and external disk 105a. Because the external disk 105a is mapped with the virtual disk 108a, the disk control program 205 sends Write Command (Write Command for writing the data that is the copy object to the virtual disk 108a) that indicates the virtual disk 108a to the virtual disk library 106. The virtual disk control program 306 writes the data corresponding to this Write Command to the disk caches 141a, 141b, rather than to the tape LU 142a mapped with the virtual disk 108a. As a result, the normal LU 180a is backed up in the disk caches 141a, 141b. When such backup is completed, the disk control program 205 sets the status of the LU pair to "Duplex".

(C) The backup/restore control program 101 monitors the status of the LU pair of the normal disk LU 180a and virtual disk 108a. When this status can be detected to become "Duplex", the backup/restore control program 101 sends Pair Delete Indication for deleting this LU pair to the storage virtualization device 102. In response to this Pair Delete Indication, the disk control program 205 deletes the pair of the normal LU 180a and virtual disk 108a. In this case, the disk control program 205 sets the status of the LU pair to "Simplex" that means deletion.

(D) The backup/restore control program 101 monitors the status of the LU pair of the normal LU 180a and virtual disk 108a. When this status can be detected to become "Simplex", the backup/restore control program 101 sends the InActivate Indication that indicates the virtual disk 108a to the virtual disk library device 106. In response to this InActivate Indication, the InActivate program 305 performs after-processing. More specifically, in the after-processing, the InActivate program 305 writes sequentially all the data located in the disk caches 141a, 141b to the tape LU 142a and deletes the disk LU 141a, 141b that constituted the disk caches 141a, 141b (in other words, deletes the allocation). As a result the normal LU 180a is backed up in the tape LU 142a, and the disk LU 141a, 141b become inactive. When the InActivate program 305 starts the after-processing, it sets the status of the virtual disk 108a to "InActivate", and when the program ends the after-processing, it changes the status to "Inactive".

With the above-described processing of (A) through (D), the external disk 105 provided in the storage virtualization device 102 and the virtual disk 108 provided in the virtual disk library device 106 are mapped, and when data are to be backed up to the external disk 105a, the data are backed up to the virtual disk 108a. Furthermore, the tape LU 142a is mapped with the virtual disk 108a, but during the backup, the disk LU 141a, 141b are dynamically mapped with the virtual disk 108a, data are temporarily backed up with respect to the disk LU 141a, 141b, and finally the data located on the disk LU 141a, 141b are written sequentially to the tape LU 142a. In the storage virtualization device 102, the storage resources of the virtual disk library device 106 are provided as disks. Therefore, a write with a random write destination address (referred to hereinbelow as "random write") can be created with respect to the virtual disk 108a, but even if the random write is created, since it is created with respect to the disk LU 141a, 141b, it is not created for the tape LU 142a. Reading of data from the tape LU 142a to the disk LU 141a, 141b and writing of data from the disk LU 141a, 141b to the tape LU 142a are performed sequentially.

It follows from the above that a server for backup is unnecessary and that the backup can be rapidly completed even if the backup destination is a tape 112.

However, a restore processing is also conducted in the first embodiment. In the restore processing, the following processing (a) through (d) is performed. The restore processing will be described below. In this case, the explanation of features that were explained in the backup processing will be omitted or simplified.

(a) The backup/restore control program 101 sends the Activate Indication that indicates the virtual disk 108a to the virtual disk library device 106. The Activate program 304 performs the pre-processing in response to this Activate Indication. As a result, all the data located in the tape LU 142a are prepared in the disk cache 141a, 141b.

(b) When the backup/restore control program 101 detects that the status of the virtual disk 108a has become "Active", the program sends a Pair Create Indication taking the normal LU 180a as a secondary LU and the external disk 105a as a primary LU to the storage virtualization device 102. The disk control program 205 creates a pair of the normal LU 180a as a secondary LU and the external disk 105a as a primary LU in response to this Pair Create Indication and copies the data stored by the external disk 105a to the normal LU 180a, thereby making the contents of the normal LU 180a identical to the contents of the external disk 105a. Data that are the copying object may be all the data in the external disk 105a or the data representing the difference between the normal LU 180a and external disk 105a. The disk control program 205 sends a Read Command indicating the virtual disk 108a (a read command for reading data that are the copying object) to the virtual disk library device 106. According to this Read Command, the virtual disk control program 306 reads data from the disk caches 141a, 141b and sends the data that are read out to the storage virtualization device 102. The disk control program 205 writes the data from the virtual disk library device 106 to the normal LU 180a. As a result, the data of the virtual disk 108a are restored in the normal LU 180a.

(c) When the backup/restore control program 101 detects that the status of the LU pair of the normal disk LU 180a and virtual disk 108a became "Duplex", this program sends a Pair Delete Indication for deleting this LU pair to the storage virtualization device 102. The disk control program 205 deletes a pair of the normal LU 180a and virtual disk 108a in response to this Pair Delete Indication.

(d) When the backup/restore control program 101 detects that the status of the LU pair of the normal disk LU 180a and virtual disk 108a became "Simplex", this program sends an InActivate Indication that indicates the virtual disk 108a to the virtual disk library device 106. The InActivate program 305 performs after-processing in response to the InActivate Indication.

With the processing (a) through (d) described above, the external disk 105 and virtual disk 108 are mapped, and when data are restored from the external disk 105a, the data are restored from the virtual disk 108a. Furthermore, the tape LU 142a is mapped with the virtual disk 108a, but when data are restored, the disk LU 141a, 141b are dynamically mapped with the virtual disk 108a, the data are temporarily restored to the disk LU 141a, 141b, and finally the data are restored from the disk LU 141a, 141b to the normal LU 180. In the storage virtualization device 102, the storage resources of the virtual disk library device 106 are provided as disks. Therefore, a read with a random read source address (referred to hereinbelow as "random read") can be created with respect to the virtual disk 108a, but even if the random read is created, since it is created with respect to the disk LU 141a, 141b, it is not created for the tape LU 142a. Reading of data from the tape LU 142a to the disk LU 141a, 141b and writing of data from the disk LU 141a, 141b to the tape LU 142a are performed sequentially.

It follows from the above that a server for restoration is not required and that the restoration can be ended at a high rate even if the restore source is the tape 112.

In the above-described backup processing and/or restore processing, at least one indication of the Activate Indication and InActivate Indication may be issued by the disk control program 205, rather than by the backup/restore control program 101. More specifically, for example, the disk control program 205 may issue the Active Indication to the virtual disk 108a that is mapped with the external disk 105a, prior to performing tape copying in response to the Pair Create Indication. Likewise, for example, the disk control program 205 may issue the InActivate Indication to the virtual disk 108a that is mapped with the external disk 105a that was pair deleted when the pair was deleted in response to the Pair Delete Indication.

Furthermore, for example, when the virtual disk control program 306 receives a Data Access Command (Write Command or Read Command) relating to the virtual disk 108a, if all the data present in the tape LU 142a has not been prepared in the disk cache 141a, 141b, then this program returns a predetermined error to the source that issued the Data Access Command, whereby this issuance source is requested to send an Activate Indication, or the data present in the tape LU 142a may be loaded into the disk cache 141a, 141b, without reporting the error to the issuance source.

In the example shown in FIG. 38, one tape group was configured of three tape LU 142a through 142c, and in this tape group, the three tape LU 142a through 142c are continuous. There is a possibility of a plurality of tape LU be mixed on the same tape 112 in one tape group. More specifically, the ending address of the tape LU 142b and the starting address of the tape LU 142c are positioned in the middle of the tape 112b, whereby the tape LU 142b and tape LU 142c are present on the same tape 112b. In other words, in the first embodiment, the "tape group" is configured of one or more tapes 112, has one or more tape LU 142, and is stored in a sequence of a plurality of tape LU. The Activate program 304 may read all the data present in the tape group having a tape LU 142a into the disk cache 141a, 141b. The Inactivate program 305 can write sequentially the data located in the disk cache 141a, 141b in the tape group. For this reason, in the control program 1110, the total storage capacity of the disk LU constituting the disk cache becomes equal to or larger than the storage capacity of the tape group (total storage capacity of the tape LU 142a through 142c). If a state is assumed in which data of tape LU other than the tape LU 142a are not present, the Activate program 304 may perform reading of all the data only from this tape LU 142a. Furthermore, among a plurality of tape LU present in one tape group, there may be two or more tape LU including a tape LU (object tape LU) corresponding to the indicated virtual disk. In this case, for example, in a tape having the ends of those two or more tape LU, the data of other tape LU present in the same tape group are not present beyond the ends. The tape LU at the head of those two or more tape LU can be taken as an object tape LU.

The first embodiment will be described below in greater detail.

In the disk control management tale 206 (see FIG. 2), for example, as shown in FIG. 22, there are present a field 1101 for writing a pair ID, a field 1102 for writing a primary LUN, a field 1103 for writing a secondary LUN, and a field 1104 for writing a pair status. A pair ID, a primary LUN, a secondary LUN, and a pair status are associated with one pair. The primary LUN is a LUN of a primary LU (copy source). The secondary LUN is a LUN of a secondary LU (copy destination).

Figure 34:
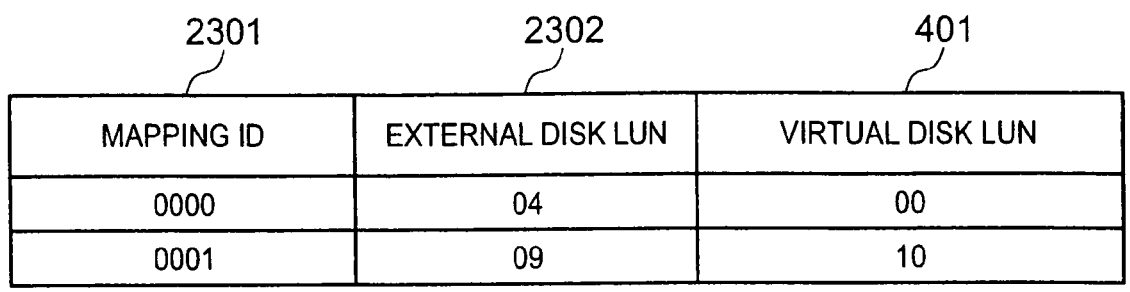
FIG. 34 illustrates a configuration example of an external disk mapping table 209.

The external disk mapping table 209 (see FIG. 2) is a table for managing the correspondence of the external disk 105 and the virtual disk 108. The external disk mapping table 209 is created when the external disk 105 is set. The external disk mapping table 209, for example, as shown in FIG. 34, has a field 2302 for writing an external disk LUN, a field 401 for writing a virtual disk LUN, and a field 2301 for writing a mapping ID for uniquely identifying the correspondence relationship of those LUN. One or a plurality of virtual disk LUN may be mapped with one external disk LUN, and a plurality of external disk LUN may be mapped with one virtual disk LUN.

The virtual disk control management table 307 (see FIG. 3), for example, includes a LU relevant table, a virtual disk management table, a RAID group management table, a disk LU management table, a tape group management table, a tape LU management table, and an IO management table. Each of those tables will be described below.

FIG. 4 shows an example of a LU relevant table.

The LU relevant table 1111 describes the correspondence relationship of logical volumes. More specifically, for example, the LU relevant table 1111 has a field 1111a for writing a virtual disk LUN, a field 1111b for writing a disk LUN, a field 1111c for writing a tape LUN. A virtual disk LUN, a disk LUN, and a tape LUN are associated with one virtual disk 108. In FIG. 4, describing the disk LUN means that a disk cache is reserved, and when the disk LUN is not described, it means that the disk cache is not reserved. LUN is an abbreviation of Logical Unit Number and is an ID for uniquely identifying a LU (logical volume).

FIG. 5 illustrates an example of a virtual disk management table.

The virtual disk management table 150 is a table for managing the virtual disks. More specifically, for example, the virtual disk management table 150 has a field 150a for writing a virtual disk LUN, a field 150b for writing a virtual disk size (storage capacity), and a field 150c for setting the first write flag. A virtual disk LUN, a size, and a first write flag are associated with one virtual disk 108. The "first write flag" is a flag demonstrating whether or not the writing to the virtual disk is the first writing. When it is the first, the flag is "1", and when it is not the first, the flag is "0". In other words, when virtual disks are set, all the first write flags are set to "1", and when writing it to be conducted to the virtual disk, the first write flat corresponding to the virtual disk is set to "0". If the write to the virtual disk is the first, the read from the tape LU 142 to the disk cache can be made unnecessary.

FIG. 6 is an example of the RAID group management table.

The RAID group management table 151 is a table for managing the RAID group. More specifically, for example, the RAID group management table 151 has a field 151a for writing a RAID group ID, a field 151b for writing a disk LU, and a field 151c for wiring the ID (disk ID) of the disk device. A RAID group ID, a disk LUN of the disk LU in the RAID group, and a disk ID of the disk 104 constituting the RAID group are associated with one RAID group.

FIG. 7 illustrates an example of the disk LU management table.

The disk LU management table 154 is a table for managing the disk LU. More specifically, for example, the disk LU management table 154 has a field 154a for writing a disk LUN, a field 154b for writing a disk LU size (storage capacity), a field 154c for writing a disk address, a field 154d for writing a disk LU status, and a field 154e for writing a last tape LUN address. A disk LUN, a size, a disk address, a disk LU status, and a last tape LUN address are associated with one disk LU 141. The "disk address" is a value indicating the location of a disk LU on the disk 104. For example, it can be represented by using a set of a disk ID (for example, 0) and an address (for example, 1000) on the disk 104. The "disk LU status" is a status of the disk LU 141. For example, it can be "in use" (being allocated as a disk cache) and "not used" (has not been allocated to any disk cache and can be allocated). The "last tape LUN address" demonstrates at which address of which tape LUN the disk LU was last used. For example, when the last tape LUN address of the disk LU reserved for the tape LU 142a is the LUN of the tape LU 142a, all the data of this tape LU 142a are present in the disk LU. Therefore, reading data from the tape LU 142a to the disk LU is not required. When the Activate program 304 reserves a disk cache, the program searches a disk LU with a "not used" disk LU status and takes the found disk LU as a constituent element of the disk cache to be reserved. Furthermore, when the Activate program 304 allocates a disk LU to the disk cache, the program describes the LUN and address of the tape LU using this disk cache in the "last tape LUN address" column corresponding to the disk LU. In FIG. 4, the address (LUN and address) of the virtual disk LU may be written as the last tape LUN address to understand the correspondence relationship of the tape LU and virtual disk LU address.

FIG. 8 illustrates an example of the tape group management table.

The tape group management table 152 is a table for managing a tape group. More specifically, for example, the tape group management tape 152 has a field 152a for writing a tape group ID, a field 152b for writing the LUN of a tape LU on the tape group, and a field 152c for writing the ID of the tape 112 constituting the tape group. A tape group ID, a tape LUN, and a tape ID are associated with one tape group.

FIG. 9 illustrates an example of the tape LU management table.

The tape LU management table 153 is a table for managing the tape LU 142. More specifically, for example, the tape LU management table 153 has a field 153a for writing a tape LUN, a field 153b for writing a tape LU size (storage capacity), and a field 153c for writing a tape address. A tape LUN, a size, and a tape address are associated with one tape LU 132. The "tape address" is a value indicating the location of the tape LU 142 on the tape 112. For example, it can be represented by using a set of a tape ID (for example, 0) and an address (for example, 100) on the tape 112.

Figures 10, 11, 12:
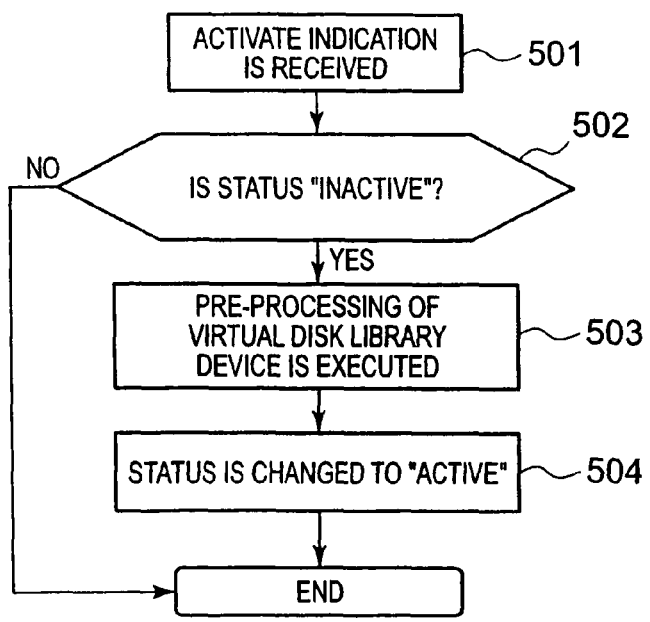
FIG. 10 illustrates an example of a status management table 1112.
FIG. 11 illustrates an example of an IO management table 1113.
FIG. 12 is a flowchart illustrating an example of an Activate processing flow.

FIG. 10 illustrates an example of the status management table 1112.

The status management table 1112 has a field 1111a for writing a virtual disk LUN and a field 1112b for writing a status of the virtual disk (referred to hereinbelow as a virtual disk status). The virtual disk status can be referred to from the backup/restore control program 101 (and/or disk control program 205). The virtual disk status can be "Active", which means a state in which data access can be performed, and "Inactive", which means a state in which data access is impossible. The backup/restore control program 101 (and/or disk control program 205) can know the present processing state or whether the access to the object virtual disk is possible by the virtual disk status of each virtual disk. The processing contents in each virtual disk status is managed with the below-described IO management table.

FIG. 11 illustrates an example of an IO management table 1113.

The IO management table 1113 comprises a field 1113a for writing a virtual disk status and a field for writing the processing contents in the virtual disk status. The field for writing the processing contents can be a field 1113b for writing whether the processing of a Read/Write Command is possible and a field 1113c for writing whether the processing of a control command is possible. All virtual disk statuses that can be assumed by the virtual disk are written in the field 1113a.

The flow of processing performed in the first embodiment will be explained below.

FIG. 12 is a flowchart illustrating an example of the flow of Activate processing.

The Activate program 304 receives an Activate Indication containing a virtual disk LUN (that is, an Activate Indication indicating the virtual disk 108) from the backup/restore control program 101 (step 501). The virtual disk control program 305 provides a Virtual Disk ID Display Command for outputting the LUN of the virtual disk 108. The backup/restore control program 101 can acquire the virtual disk LUN by executing the Virtual Disk ID Display Command.

The Activate program 304 recognizes whether or not the status of the virtual disk 108 that was indicated (referred to hereinbelow as "indicated virtual disk") is Inactive by referring to the status management table 1112.

When the virtual disk status is not Inactive (N in step 502), the Activate program 304 ends the Activate processing.

On the other hand, when the status of the indicated virtual disk is Inactive (Y in step 502), the Activate program 304 executes the pre-processing of the virtual disk library 106 (step 503). The pre-processing is a processing enabling the access to the indicated virtual disk 108. In the virtual disk library 106, because the data save medium is the tape 112 with sequential access, when the direct random access to the tape 112 mapped with the virtual disk 108 is permitted, the tape 112 is rewound or wound in a fast forward mode or the tape 112 is replaced and the performance is degraded. Accordingly, in the pre-processing, a processing improving the random access performance of the virtual disk library 106 is executed. The pre-processing will be described below in greater detail.

When the execution of the pre-processing is completed, the Active program 304 changes the virtual disk status to Active (step 504). The Activate processing is ended by ending this change.

Figure 13:
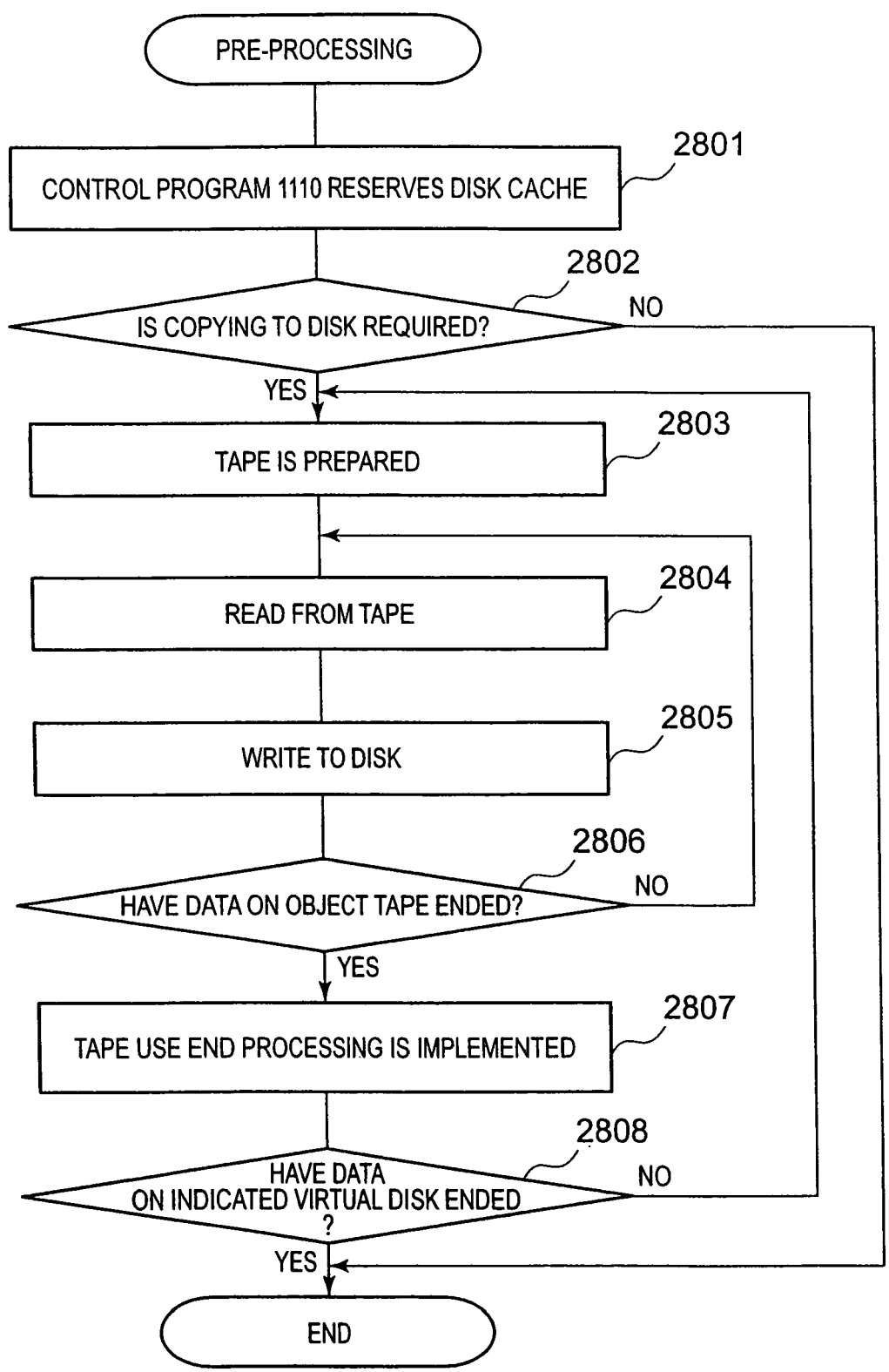
FIG. 13 illustrates an example of a pre-processing flow.

FIG. 13 is an example of the pre-processing flow.

The Activate program 304 reserves a disk space (disk cache) of a capacity necessary for the indicated virtual disk 108 (step 2801). The Activate program 304 reserves a disk cache of a storage capacity equal to or larger than the storage capacity of the indicated virtual disk, enters the LUN of the disk LU constituting the disk cache into the LU relevant table 1111 (see FIG. 4), and changes the status of the disk LU to "IN USE" in the disk LU management table 154. The last tape LUN address of the disk LU management table 154 is referred to when the disk LU is ensured, and when a tape LUN address corresponding to the indicated virtual disk is present, this disk LUN is allocated. Furthermore, in the case where the disk LUN has already been allocated to the object virtual disk in the LU relevant table 111, this disk LUN can be used as is. Furthermore, when the total storage capacity of the at least one disk LU that can be used as the disk cache (that is, the disk LU with a disk LU status "NOT USED") is less than the storage capacity of the indicated virtual disk, the Activate program 304 notifies the Activate Indication issuance source that the disk cache cannot be reserved.

The Activate program 304 then judges whether or not the tape is required to be copied to the disk (step 2802).

For example, in the case where writing to the indicated virtual disk is conducted for the first time (for example, when it could be specified from the virtual disk management table 150 that the writing to the indicated virtual disk is conducted for the first time), the Activate program 304 determines that copying is not required. This is because the data that have to be read are present in the tape LU corresponding to the indicated virtual disk.

Furthermore, when effective data are already present on the reserved disk cache, the Activate program 304 determines that copying is not required. The "effective data" are the data identical to all the data located in the tape LU corresponding to the indicated virtual disk. In other words, the expression "effective data are present" means that data of the tape LU corresponding to the indicated virtual disk are present on the disk cache. This can be specified by referring to the last tape LUN address (see FIG. 7) corresponding to the disk LUN of each disk LU constituting the disk cache. More specifically, "the case in which the effective data are present" takes place when the data of the tape LUN corresponding to the indicated virtual disk completely match the last tape LUN address corresponding to the disk LUN of each disk LU constituting the disk cache. Copying is determined to be unnecessary when the effective data are present because all the data located in the tape LU corresponding to the indicated virtual disk are already present on the disk cache.

When the copying is judged to be unnecessary, the Activate program 304 ends the pre-processing. On the other hand, when the copying is judged to be necessary, the virtual disk status of the indicated virtual disk is changed to "Activate" and the processing flow advances to the next step 2803.

When copying from the tape to the disk is judged to be necessary, the Activate program 304 issues an indication to the robot 110 to prepare an object tape 112 on the tape drive 111 (step 2803). Here the "object tape" is a tape having a tape LUN (that is, a read object) corresponding to the indicated virtual disk.

The object tape 112 is prepared in the tape drive 111, data are read from the object tape 112, and the data that are read are written in the cache memory 309 of the virtual disk array controller 107 (step 2804).

The data written in the cache memory 309 are written by the Activate program 304 into the reserved disk cache (step 2805).

When the data that have to be read remain in the object tape 112 (NO in step 2806), the Activate program 304 continues reading the object tape 112 and repeats the steps from step 2804 to step 2805. When no data that have to be read remain, the Activate program 304 ends reading the object tape 112 (step 2806).

When reading of the object tape 112 ends, the Activate program 304 implements the tape use end processing such as rewinding or unloading of the object tape 112 (step 2807).

When all the data of the indicated virtual disk are prepared on the disk cache, the Activate program 304 ends the pre-processing. When the data are stored on a plurality of object tapes 112 (NO in step 2808), the program returns to step 2803 and, if necessary, switches the object tapes 112 and continues copying.

An example of the pre-processing flow was described above. The following object tape judgment processing may be performed from YES in step 2802 to step 2803 in FIG. 13.

Figure 14:
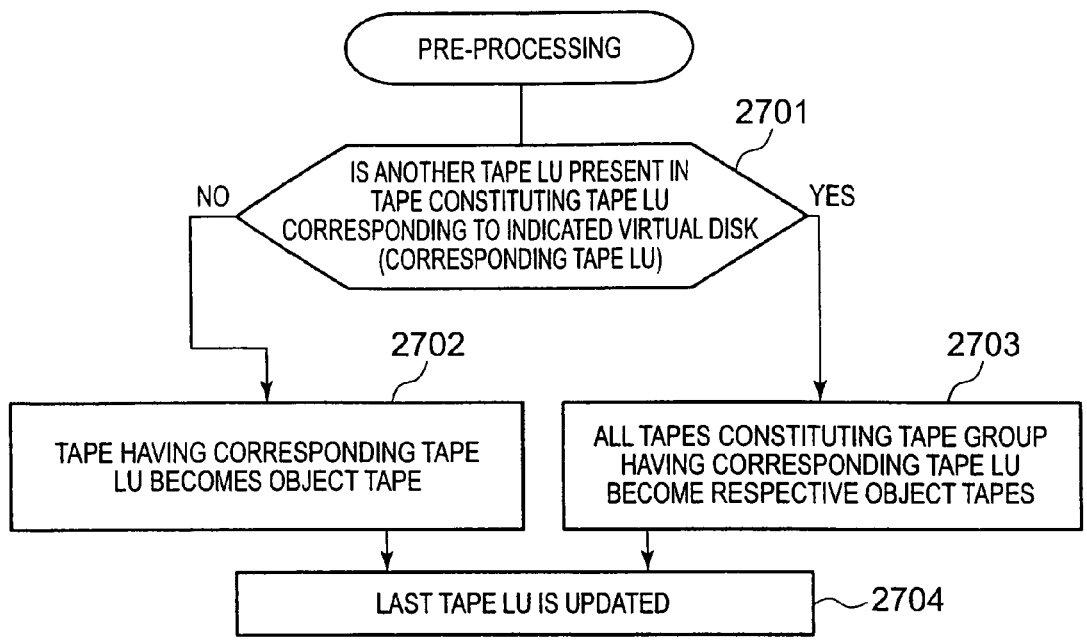
FIG. 14 illustrates an example of an object tape determination processing.

FIG. 14 shows an example of the object tape judgment processing.

When the absence of other tape LU in the tape 112 constituting the tape LU 142 corresponding to the indicated virtual disk 108 (referred to hereinbelow as the "corresponding tape LU") can be specified from the tape group management table 152 and tape LU management table 153 (see FIG. 9) (NO in step 2701), the Activate program 304 takes the tape 112 having the corresponding tape LU 142 as the object tape 112 as referred to in step 2806 (step 2702).

On the other hand, when the presence of other tape LU in the tape 112 constituting the corresponding tape LU 142 can be specified from the tape group management table 152 and tape LU management tape 153 (YES in step 2701), the Activate program 304 takes all the tapes 112 constituting the tape group having the corresponding tape LU 142 as the respective object tapes 112 (step 2703).

In other words, the Activate program 304 ensures that all the data recorded in the tapes 112 are read. Rephrasing, the Activate program 304 makes sure that writing is not ended only in some of the tapes 112 in the above-described after-processing. When data of a plurality of tape LU were read on one disk cache, management can be performed with a tape that does not display the correspondence between the tape LU and address on the disk cache, whereby the location of data on the disk cache and the tape LU for writing the data can be specified.

After the step 2702 or 2703, the Activate program 304 associates the tape LUN on the object tape 112 (for example, a tape LUN in step 702 or all the tape LUN on the tape group in step 703) as a last tape LUN address (see FIG. 7) with each disk LU 141 constituting the reserved disk cache and advances to step 2803 shown in FIG. 13 (step 2704).

Figure 15:
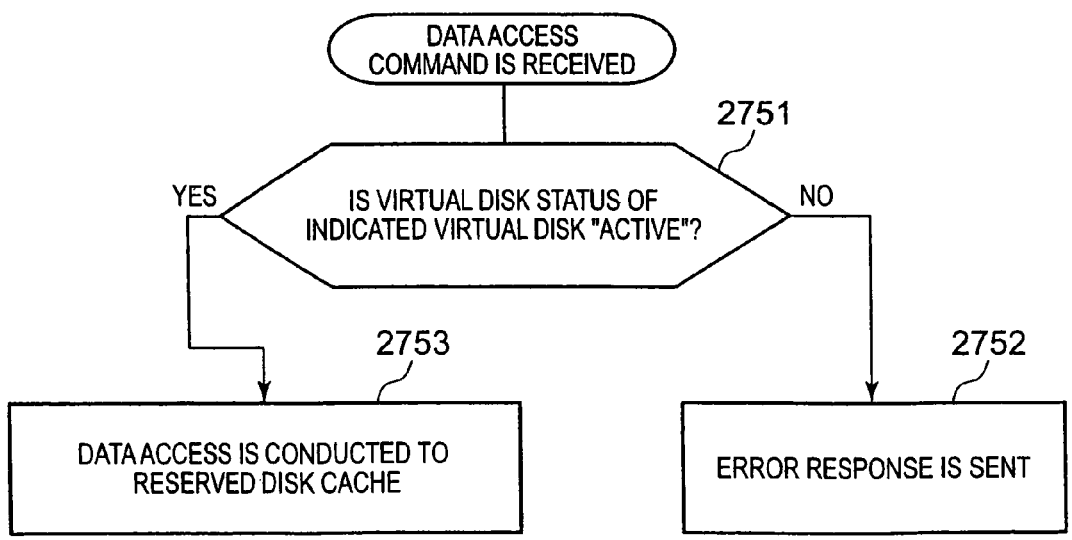
FIG. 15 illustrates an example of a data access control processing performed by the virtual disk control program 306.

FIG. 15 shows an example of data access control processing performed by the virtual disk control program 306.

When the virtual disk control program 306 receives a Data Access Command (Read Command or Write Command), it refers to the status management tape 1112 and judges whether the status of the virtual disk 108 indicated by the Data Access Command is "Active". When it is not "Active" (NO in step 2751), the virtual disk control program 306 sends an error response (step 2752). On the other hand, when the status of the indicated virtual disk 108 is "Active" (YES in step 2751), the virtual disk control program 306 performs data access (data read or write) with respect to the disk cache that was reserved for the virtual disk 108 (step 2753).

The processing of performing the use end of the virtual disk will be explained below. When data access to the indicated virtual disk 108 is completed, the indication program 21 or management program 31 performs End Indication to the virtual disk library device 106. This indication is termed Inactivate Indication. Because the total storage capacity of the disk device 12 is less than the total storage capacity of the virtual disk 108, the reserved disk cache (that is, the disk space) has to be deleted from the virtual disk 108 for which data access is not performed. In the indication program 21 or management program 31, the Inactivate Indication is issued to the virtual disk in the Active state (for example, the above-described indicated virtual disk for which the Activate Indication was issued) manually by a user or a manager or automatically when backup or archive completion is detected.

Figure 16:
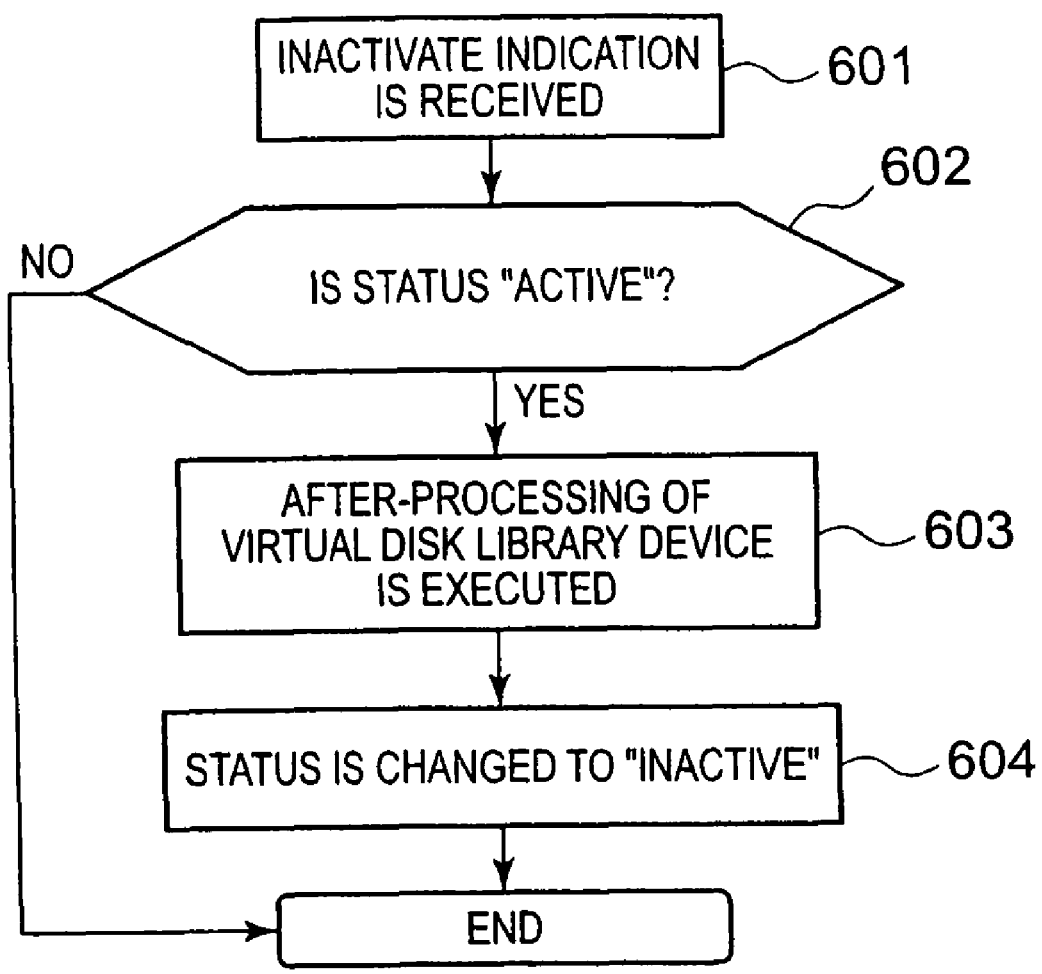
FIG. 16 is a flowchart illustrating an example of an Inactivate processing flow.

FIG. 16. shows a flowchart illustrating an example of the Inactivate processing flow.

The Inactivate program 305 receives an Inactivate Indication (Inactivate Indication indicating a virtual disk) comprising the virtual disk LUN from the backup/restore control program 101 (step 601).

The Inactivate program 305 recognizes whether or not the status of the indicated virtual disk is Active by referring to the status management table 1112 (step 602). Then the status of the indicated virtual disk is not Active (N in step 602), the Inactivate program 305 ends the Inactivate processing.

On the other hand, when the status of the indicated virtual disk is Active, the Inactivate program 305 executes the after-processing (step 603). The after-processing is a processing making it impossible to access the virtual disk 108 that was Inactivate indicated. The after-processing will be described below in greater detail.

When the execution of the after-processing ends, the Inactivate program 305 changes the status of the indicated virtual disk to Inactive (step 604). Once this change is completed, the Inactivate processing is completed.

Figure 17:
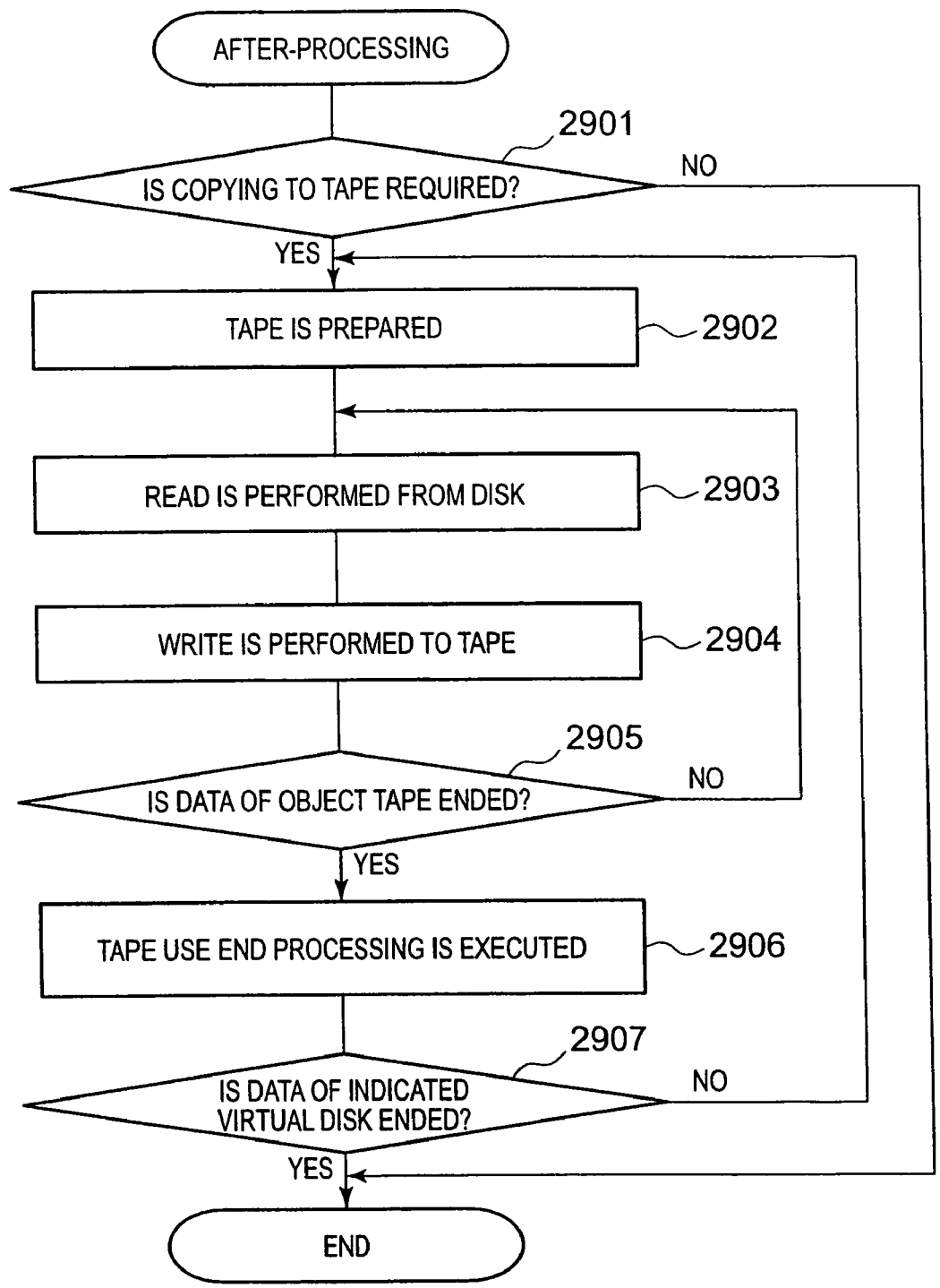
FIG. 17 illustrates an example of an after-processing flow.

FIG. 17 shows an example of the flow of the after-processing.

The Inactivate program 305 determines whether copying from the disk cache to the tape 112 is required (step 2901). For example, when there was no update of the disk cache in an Active mode, the Inactivate program 305 determines that copying is not required. This is because there is no difference between all the data on the disk cache corresponding to the indicated virtual disk 108 and all the data in the tape LU (or all the tape LU on the tape group corresponding to the indicated virtual disk) 142 corresponding to the indicated virtual disk 108. When copying is determined to be not required, the Inactivate program 305 ends the after-processing. When the copying is determined to be required, the Inactivate program 305 changes the virtual disk status of the indicated virtual disk 108 into "Inactivate" and advances to the next step 2902.

When copying from the disk cache to the tape 112 is determined to be necessary, the Inactivate program 305 executes the preparation of the object tape 112 in the tape drive 111 with the robot 110 (step 2902). The "object tape" as referred to herein is a tape 112 having a tape LU 142 corresponding to the disk cache. For this reason, for example, when step 2702 shown in FIG. 14 is executed, the object tape is a tape 112 having a tape LU corresponding to the indicated virtual disk, and when step 2703 is executed, the object tape is each tape 112 constituting the tape group corresponding to the indicated virtual disk.

The object tape 112 is prepared in the tape drive 131 and data are read from the disk cache (disk LU) to the cache memory 309 of the virtual disk controller 107 (step 2903). The data that are read into the cache memory 309 are written into the object tape 112 (step 2904).

When the data that have to be read remain in the disk cache (NO in step 2905), the Inactivate program 305 continues reading from the disk cache and repeats the step 2903 and step 2904. When there remain no data that have to be read (YES in step 2905), the Inactivate program 305 ends reading.

When writing into the object tape 112 ends, the Inactivate program 305 executes the tape use end processing, such as rewinding or unloading, of the object tape 112 (step 2906).

When all the data present on the disk cache can be stored in the object tape 112 (YES in step 2907), the Inactivate program 305 ends the after-processing. On the other hand, when the data are stored in a plurality of object tapes 112, the control program 1110 returns to step 2902 and, if necessary, switches the object tape 112 and continues copying (step 2907). Because the data are copied from the disk cache to the object tape 112, the data that are written into the object tape 112 remain in the disk cache that is the copy source. For this reason, for example, in the case where the disk LU constituting the disk cache of the indicated virtual disk was deleted and the data in this disk LU was allocated again to the disk cache of the indicated virtual disk, without updating, all the data located in the tape LU corresponding to this indicated virtual disk remain in the disk LU. Once the after-processing is completed, the data located on the disk cache may be deleted.

Figure 18:
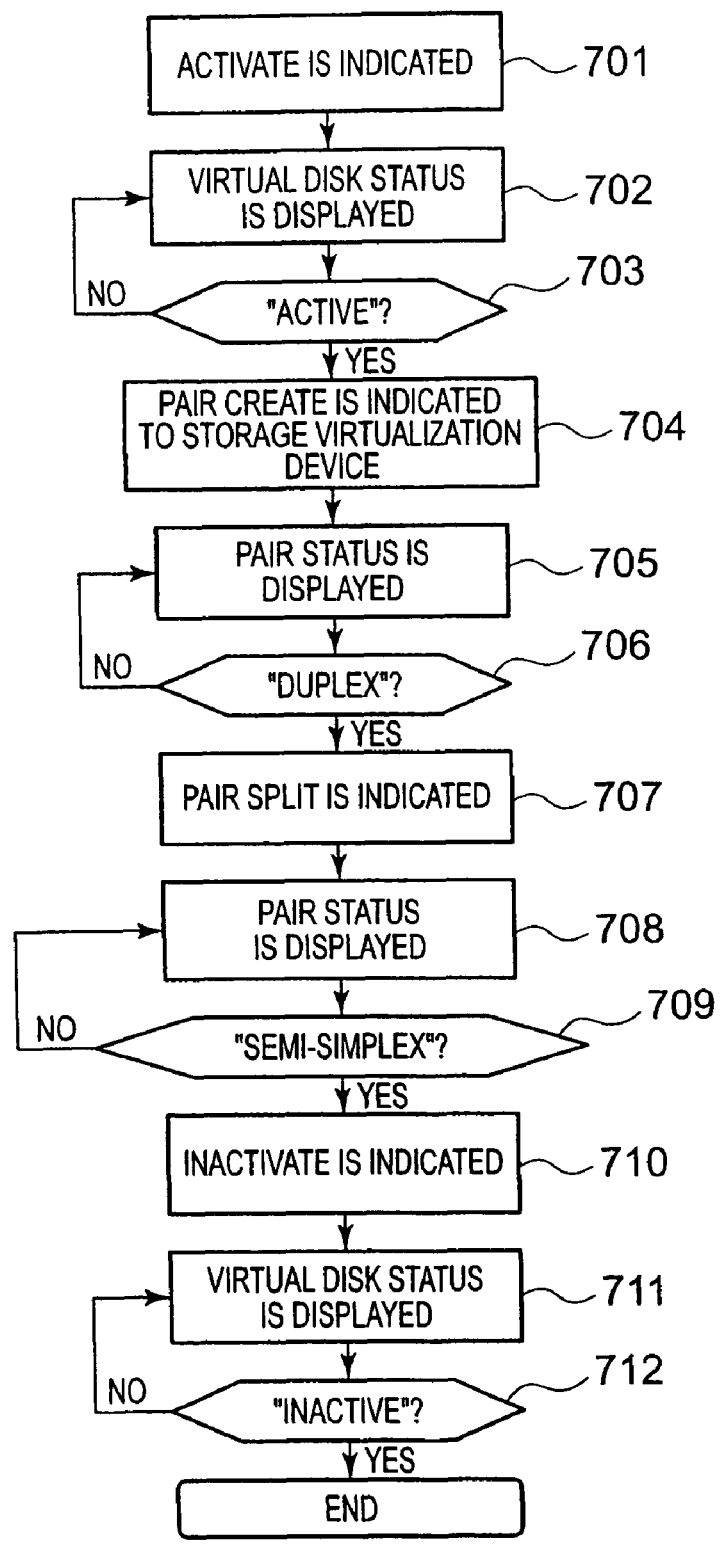
FIG. 18 is a flowchart illustrating the processing flow performed by a backup/restore program 101 in backup processing.

FIG. 18 is a flowchart illustrating an example of the processing flow performed by the backup/restore control program 101 in the backup processing.

For example, a backup processing is indicated to the backup/restore control program 101 by a job scheduler or a manager (not shown in the figure). A case where the data of the normal LU 180a are backed up to the external disk 105a will be considered hereinbelow as an example.

When backup processing is executed, no writing will be assumed to be performed to the normal LU 180a, which is the backup object. More specifically, for example, the backup/restore control program 101 may prohibit writing data to the computer program (for example an application program (not shown in the figure) of the computer 100) for which there is a possibility of writing data to the normal LU 180a.

In step 701, the backup/restore control program 101 issues an Activate Indication including a LUN of the virtual disk 108a to the Activate program 304.

In step 702, the backup/restore control program 101 issues a Status Display Command including a LUN of the virtual disk 108a to the virtual disk control program 306. The virtual disk control program 306 that received the Status Display Command refers to the status management table 1112 and returns a virtual disk status corresponding to the LUN of the virtual disk 108a.

In step 703, the backup/restore control program 101 determines whether the virtual disk status that was received as the return value of the Status Display Command is "Active". If it is not "Active", the backup/restore control program 101 executes step 702. If it is "Active", the backup/restore control program 101 executes step 704.

In step 704, the backup/restore control program 101 issues to the disk control program 205 a Pair Create Indication for creating a pair in which the normal LU 180a serves as a primary LU and the external disk 105 serves as a secondary LU. As a result, a pair of the normal LU 180a and external disk 105a is generated, as shown in FIG. 20.

In step 705, the backup/restore control program 101 issues a Pair Status Display Command indicating the ID of the pair to the disk control program 205. The disk control program 205 that received the Pair Status Display Command acquires the pair status corresponding to the indicated pair ID from the disk control management table 206 and returns the acquired pair status to the backup/restore control program 101. Furthermore, the disk control program 205 provides a Display Command for outputting information of the disk control management table 206, and the backup/restore control program 101 can acquire the information of the disk control management table 206 from the disk control program 205 by executing this Display Command. Furthermore, the disk control program 205 provides a Delete Command for deleting pair information of the disk control management table 206, and can delete the pair information relating to the pair ID by indicating the pair ID of the pair that is to be deleted. The pair information is the pair ID, and values of primary LUN, secondary LUN, and pair status in the disk control management table 206.

In step 706, the backup/restore control program 101 determines as to whether the pair status returned from the disk control program 205 is "Duplex". If the pair status is not "Duplex", the backup/restore control program 101 executes step 705. If the pair status is "Duplex", the backup/restore control program 101 executes step 707.

In step 707, the backup/restore control program 101 issues a Pair Split Indication that indicates the pair ID to the disk control program 205.

In step 708, the backup/restore control program 101 issues a Pair Status Display Command that indicates the pair ID to the disk control program 205.

In step 709, the backup/restore control program 101 determines as to whether the pair status is "Semi-Simplex". If the pair status is not "Semi-Simplex", the backup/restore control program 101 executes step 708. If the pair status is "Semi-Simplex", the backup/restore control program 101 executes step 710.

In step 710, the backup/restore control program issues an Inactivate Indication including a LUN of the virtual disk 108a to the Inactivate program 305.

In step 711, the backup/restore control program 101 issues a Virtual Disk Status Display Command containing a LUN of the virtual disk 108a to the virtual disk control program 306.

In step 712, the backup/restore control program 101 determines whether the virtual disk status received as a return value of the Virtual Disk Status Display Command is "Inactive". If this status is "Inactive", the backup/restore control program 101 executes step 711. If it is "Inactive", the backup/restore control program 101 executes backup processing.

FIG. 19 is a flowchart illustrating an example of a LU pair creation processing of the disk control program 205.

In step 801, the disk control program 205 receives a LU Pair Create Command from the backup/restore control program 101 and creates a pair of the indicated primary LU (for example, the normal LU 180a) and a secondary LU (for example, an external disk 105a). First, the disk control program 205 allocates the pair ID to the pair of the indicated primary LU and secondary LU, and sets the pair ID, primary LUN, and secondary LUN in the disk control management table 206. In addition to the LUN, respective target ID can be added to the primary LUN and secondary LUN. After the creation of the pair, the disk control program 205 copies data from the primary LU to the secondary LU. The pair status during copying is "COPY". After the creation of the pair, the disk control program 205 sets "COPY" in the pair status 1104. The copying stops as soon as the primary LU and secondary LU become identical, but when writing was conducted into the primary LU, a state is immediately assumed in which copying to the secondary LU is performed. This state is considered as a Duplex state.

In step 802, the disk control program 205 sets "Duplex" to the pair status 1104. When setting of the pair status is ended, the pair creation processing is completed.

FIG. 21 is a flowchart illustrating an example of a pair split processing flow of the disk control program 205.

In step 1001, the disk control program 205 receives a Pair Split Indication from the backup/restore control program 101 and executes the split processing of the indicated pair. The disk control program 205 sets the indicated pair into a split state. The split state is a state in which no copying to the secondary LU is performed even when data are written into the primary LU. This state is termed a Semi-Simplex state. In the Semi-Simplex state, the disk control program 205 manages the difference in data between the primary LU and secondary LU. Since the disk control program 205 manages the difference, when the pair creation processing is again executed, it is not necessary to copy all the data and the Duplex state can be produced by copying only the differential data.

In step 902, the disk control program 205 sets "Semi-Simplex" to the pair status 1104. Once setting of the pair status 1104 is ended, the pair split processing is ended.

Figure 23:
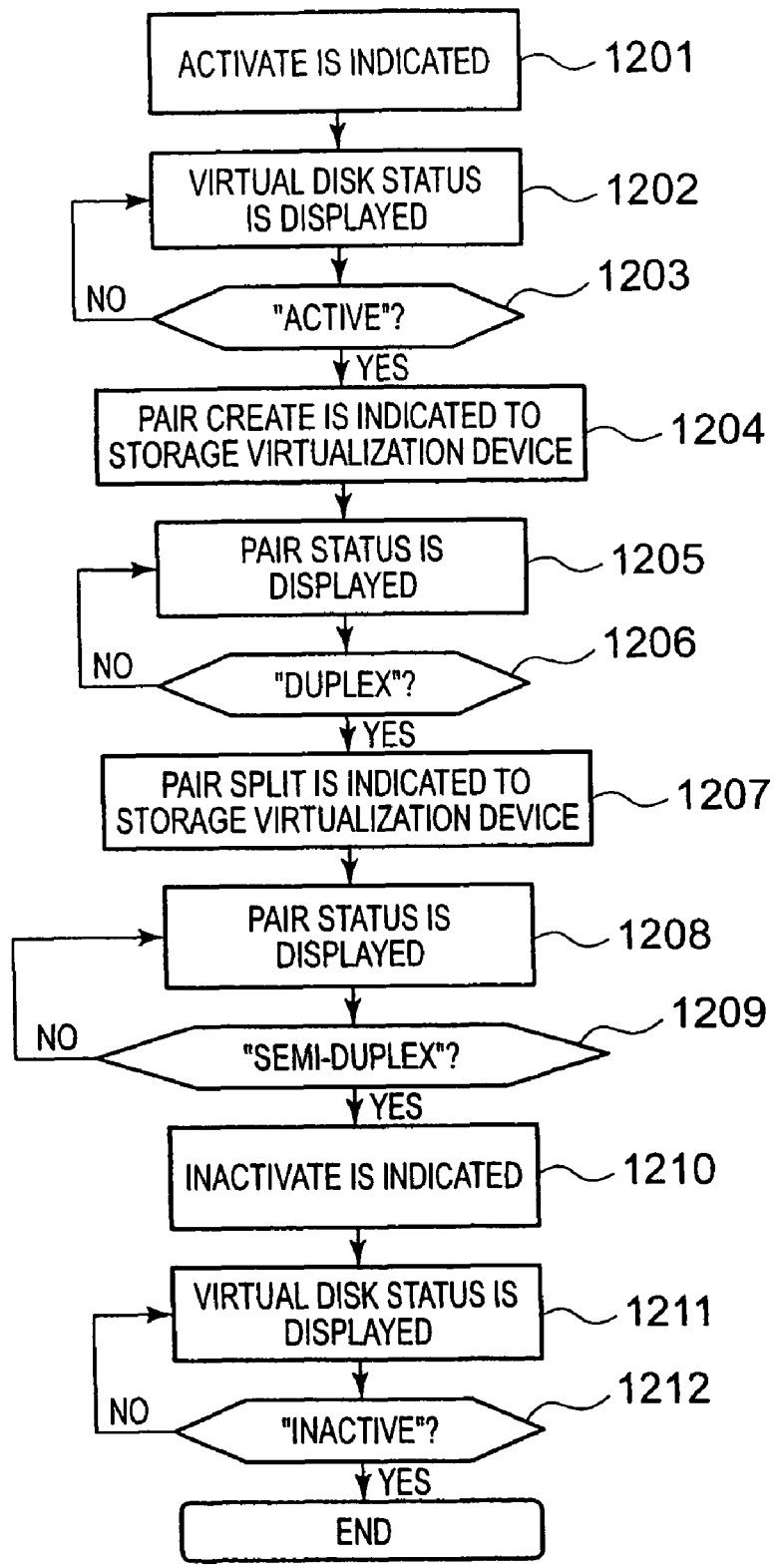
FIG. 23 is a flowchart illustrating an example of a processing flow performed by the backup/restore control program 101 in a restore processing.

FIG. 23 is a flowchart illustrating an example of processing flow performed by the backup/restore control program 101 in the restore processing.

For example, Restore can be indicated to the backup/restore control program 101 by a job scheduler or manager (not shown in the figure). The case where the data of the external disk 105a are restored to the normal LU 180a will be explained below by way of an example.

When the restore processing is executed, writing to the normal LU 180a, which is the restore destination for the external disk 105a, will not be performed. More specifically, for example, the backup/restore control program 101 prohibits data writing with respect to the computer program (for example, an application program that is not shown in the figure in the computer 100) that can write data to the normal LU 180a.

In step 1201, the backup/restore control program 101 issues an Activate Indication including the LUN of the virtual disk 108a to the Activate program 304.

In step 1202, the backup/restore control program 101 issues a Status Display Command including the LUN of the virtual disk 108a to the virtual disk control program 306.

In step 1203, the backup/restore control program 101 determines as to whether the status received as the return value of the Status Display Command is "Active". If the status is not "Active", the backup/restore control program 101 executes step 1202. If the status is "Active", the backup/restore control program 101 executes step 1204.

In step 1204, the backup/restore control program 101 issues to the disk control program 205 a Pair Re-synchronize Indication to take the normal LU 180a as a primary LU and to take the external disk 105a as the secondary LU.

In step 1205, the backup/restore control program 101 issues a Pair Status Display Command indicating the pair that was re-synchronized to the disk control program 205. The disk control program 205 that has received the Pair Status Display Command reads the pair status of the indicated pair from the disk control management table 206 and returns it to the backup/restore control program 101.

In step 1206, the backup/restore control program 101 determines as to whether the pair status returned from the disk control program 205 is "Duplex". If this pair status is not "Duplex", the backup/restore control program 101 executes the step 1205. If the pair status is "Duplex", the backup/restore control program 101 executes step 1207.

In step 1207, the backup/restore control program 101 issues a Pair Split Indication indicating a pair of the normal LU 180a and external disk 105a to the disk control program 205.

In step 1208, the backup/restore control program 101 issues a Pair Status Display Command indicating the aforementioned pair to the disk control program 205.

In step 1209, the backup/restore control program 101 determines as to whether the pair status received as the return value is "Semi-Simplex". If the pair status is not "Semi-Simplex", the backup/restore control program 101 executes step 1208. If the pair status is "Semi-Simplex", the backup/restore control program 101 executes step 1210.

In step 1210, the backup/restore control program 101 issues an Inactivate Indication that indicates the virtual disk 108a to the Inactivate program 305.

In step 1211, the backup/restore control program 101 issues a Virtual Disk Status Display Command that indicates the virtual disk 108a to the virtual disk control program 306.

In step 1212, the backup/restore control program 101 determines as to whether the status received as the return value of the Virtual Disk Status Display Command is "Inactive". If the status is not "Inactive", the backup/restore control program 101 executes step 1211. If the status is "Inactive", the backup/restore control program 101 end the restore processing.

Figure 24:
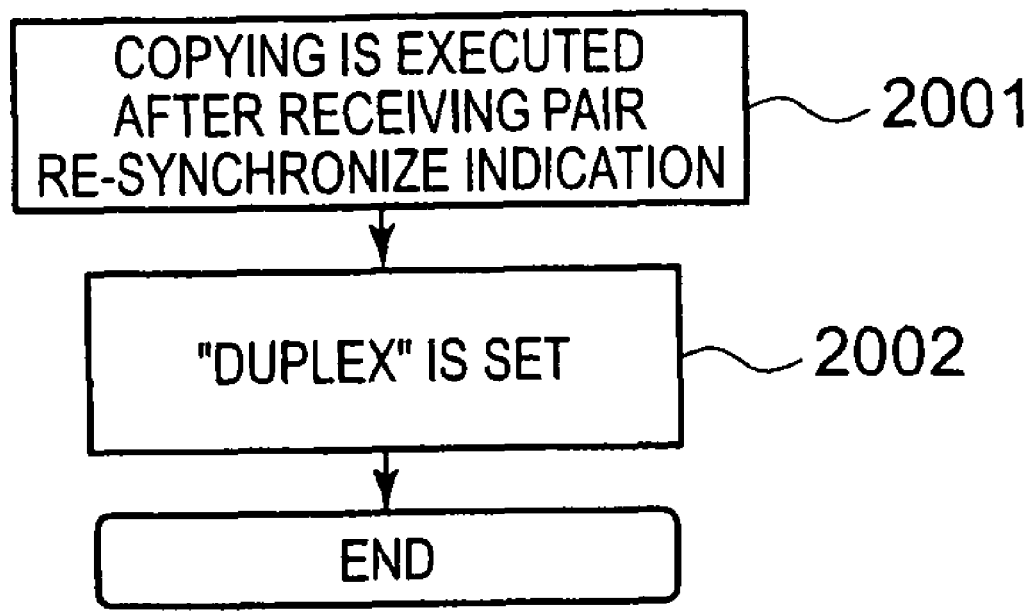
FIG. 24 is a flowchart illustrating an example of a pair re-synchronize processing of the disk control program 205.

FIG. 24 shows a flowchart illustrating an example of pair re-synchronize processing of the disk control program 205.

In step 2001, the disk control program 205 receives a Pair Re-synchronize Command from the backup/restore control program 101 and re-synchronizes the indicated pair. The disk control program 205 sets "COPY" to the pair status 1104 and copies only differential data from the primary LU to the secondary LU.

In step 2002, when the primary LU and secondary LU match each other, the disk control program 205 sets "Duplex" in the pair status 1104. If setting of the pair status 1104 is completed, the pair re-synchronize processing is completed.

The first embodiment was described hereinabove. In the first embodiment, for example, three or more LU may form the so-called cascade configuration. More specifically, as shown in FIG. 28, a LU cascade may be also configured by a secondary LU of the first pair (a pair in which the normal LU 180a serves is a primary LU and the normal LU 180b is a secondary LU) and a primary LU of the second pair (a pair in which the normal LU 180b is a primary LU and the outer disk 105a is a secondary LU). The disk control management table 206 of this case is shown by way of example in FIG. 29. In this case, for example, when data are restored from the external disk 105a to the normal LU 180a, a method can be employed by which data are temporarily restored to the normal LU 180b and restored from the normal LU 180b to the normal LU 180a. Alternatively, a method can be used by which the pair information of the normal LU 180b and external disk 105a is deleted and a pair is formed in which the primary LU is the external disk 105a and the secondary LU is the normal LU 180a, whereby restoration is performed at a high rate. Those methods can be applied to backup processing.

Furthermore, in the first embodiment, a plurality of LU may be paired as secondary LU with one normal LU 180a as shown by way of example in FIG. 30.

Embodiment 2

The second embodiment of the present invention will be described below. In the explanation below, mainly the differences with the first embodiment will be explained, whereas the explanation of the features common with the first embodiment will be omitted or simplified.

In the second embodiment, management of the difference between the primary LU and secondary LU is not performed. For this reason, in the backup processing, all the data of the normal LU 180a are copied into the external disk 105a, and in the restore processing, all the data of the external disk 105a are copied to the normal LU 180a. If the difference management is performed, the time required for backup or restoration can be shortened by comparison with the case where no difference management is performed, but when no difference management is performed, the below-described sequential read (direct reading from the tape, rather than via a disk LU) and/or sequential write (direct writing to the tape, rather than via a disk LU) can be performed. Those operations are described below.

Figure 25:
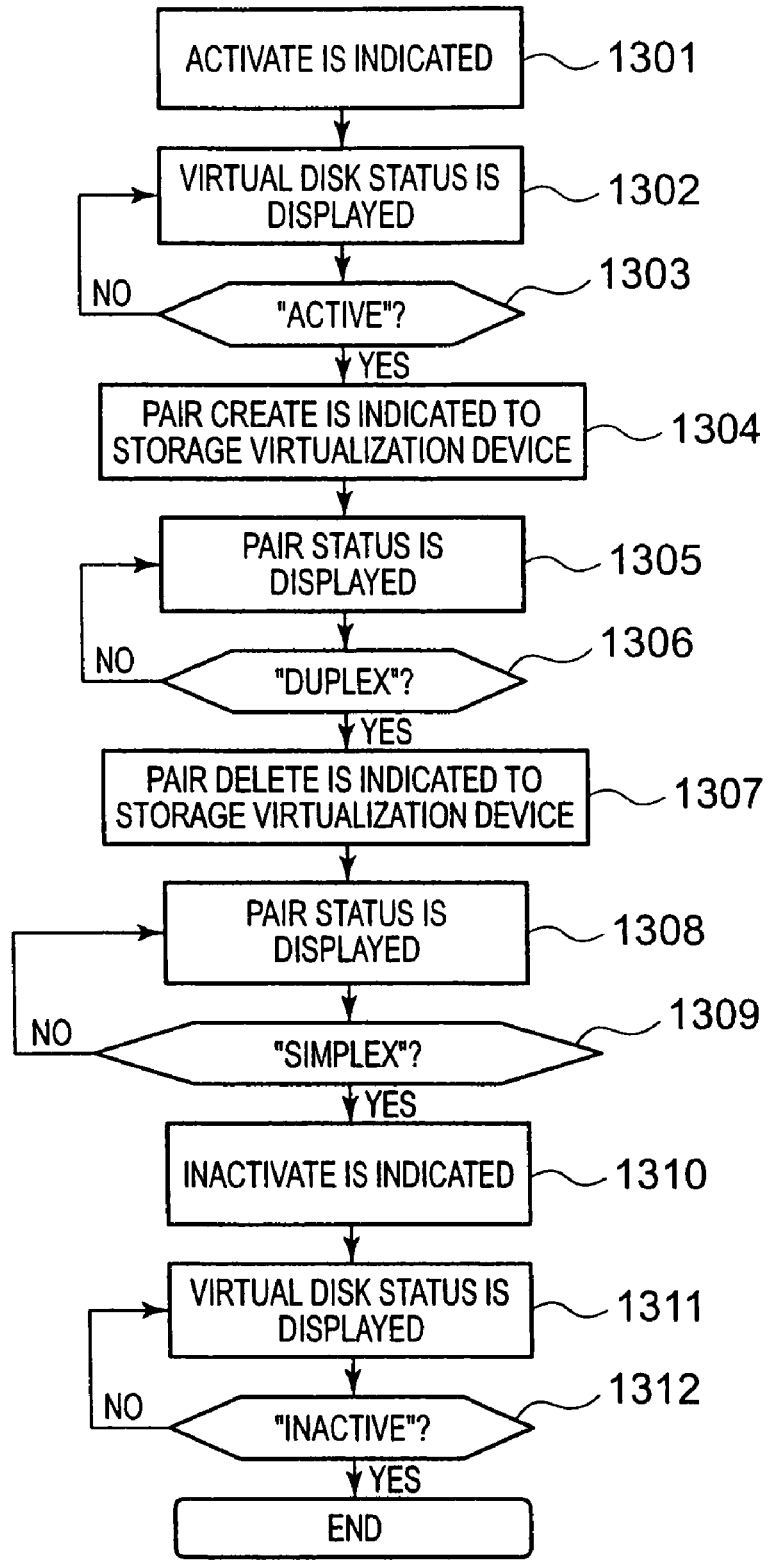
FIG. 25 is a flowchart illustrating an example of a processing executed by the backup/restore control program 101 in the backup processing of the second embodiment.
Figure 26:
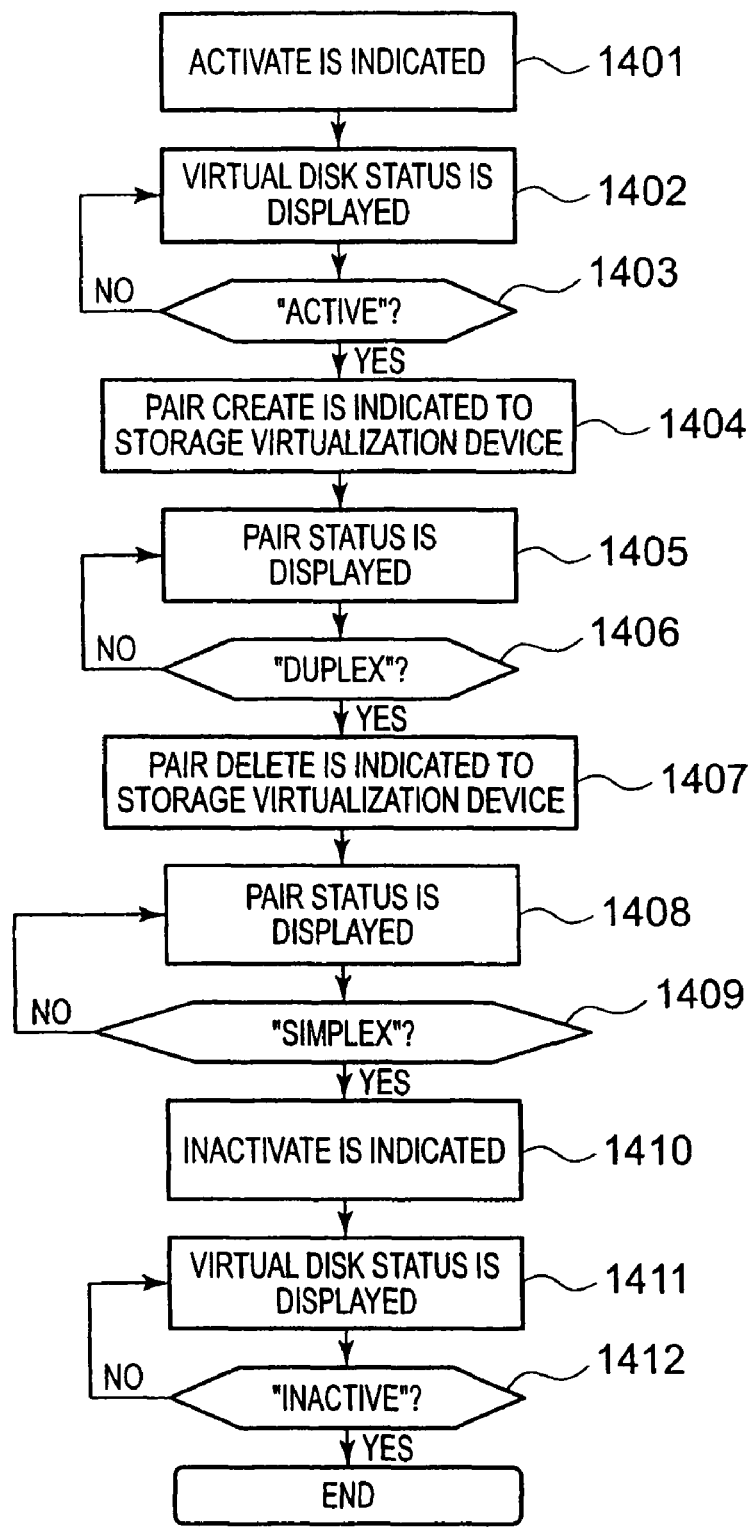
FIG. 26 is a flowchart illustrating an example of a processing executed by the backup/restore control program 101 in the restore processing of the second embodiment.

FIG. 25 is a flowchart illustrating an example of processing flow executed by the backup/restore control program 101 in the back processing of the second embodiment. FIG. 26 is a flowchart illustrating an example of processing flow executed by the backup/restore control program 101 in the restore processing of the second embodiment.

Referring to FIG. 25, steps 1301 through 1312 respectively correspond to steps 701 through 712 shown in FIG. 18, and the difference therebetween is that in step 1307, a Pair Delete Indication rather than Pair Split Indication is issued. For this reason, in step 1309, whether the status is "Simplex", rather than "Semi-Simplex", is judged.

Likewise, in FIG. 26, steps 1401 through 1412 respectively correspond to steps 1201 through 1212 shown in FIG. 23, and the difference therebetween is that in step 1407, a Pair Delete Indication rather than Pair Split Indication is issued. For this reason, in step 1409, whether the status is "Simplex", rather than "Semi-Simplex", is judged.

FIG. 27 shows a flowchart illustrating an example of a pair delete processing flow of the disk control program 205.

In step 1501, the disk control program 205 receives a Pair Delete Indication from the backup/restore control program 101 and then deletes the indicated pair. When the pair is deleted after the Duplex state, even if there is an update in the primary LU, neither this update is reflected in the secondary LU nor the difference caused by the update is managed.

In step 1502, the disk control program 205 sets "Simplex" to the pair status 1104. When the setting of the pair status 1104 is completed, the pair delete processing ends.

Furthermore, in the present embodiment, because the management of the difference between the primary LU and secondary LU is not performed, the below-described sequential read and/or sequential write can be performed. More specifically, for example, the computer can issue a sequential read and/or sequential write command. The disk array controller 103 can issue a sequential read and/or sequential write command to the virtual disk array controller 107 in response to this command. Alternatively, the disk array controller 103 can issue a sequential read and/or sequential write command to the virtual disk array controller 107 when the management of the difference between the primary LU and secondary LU is not performed, regardless of the presence or absence of a command from the computer. A sequential read command will be denoted below by "SeqRead Command" and the sequential write command will be denoted below by "SeqWrite Command".

Figure 39:
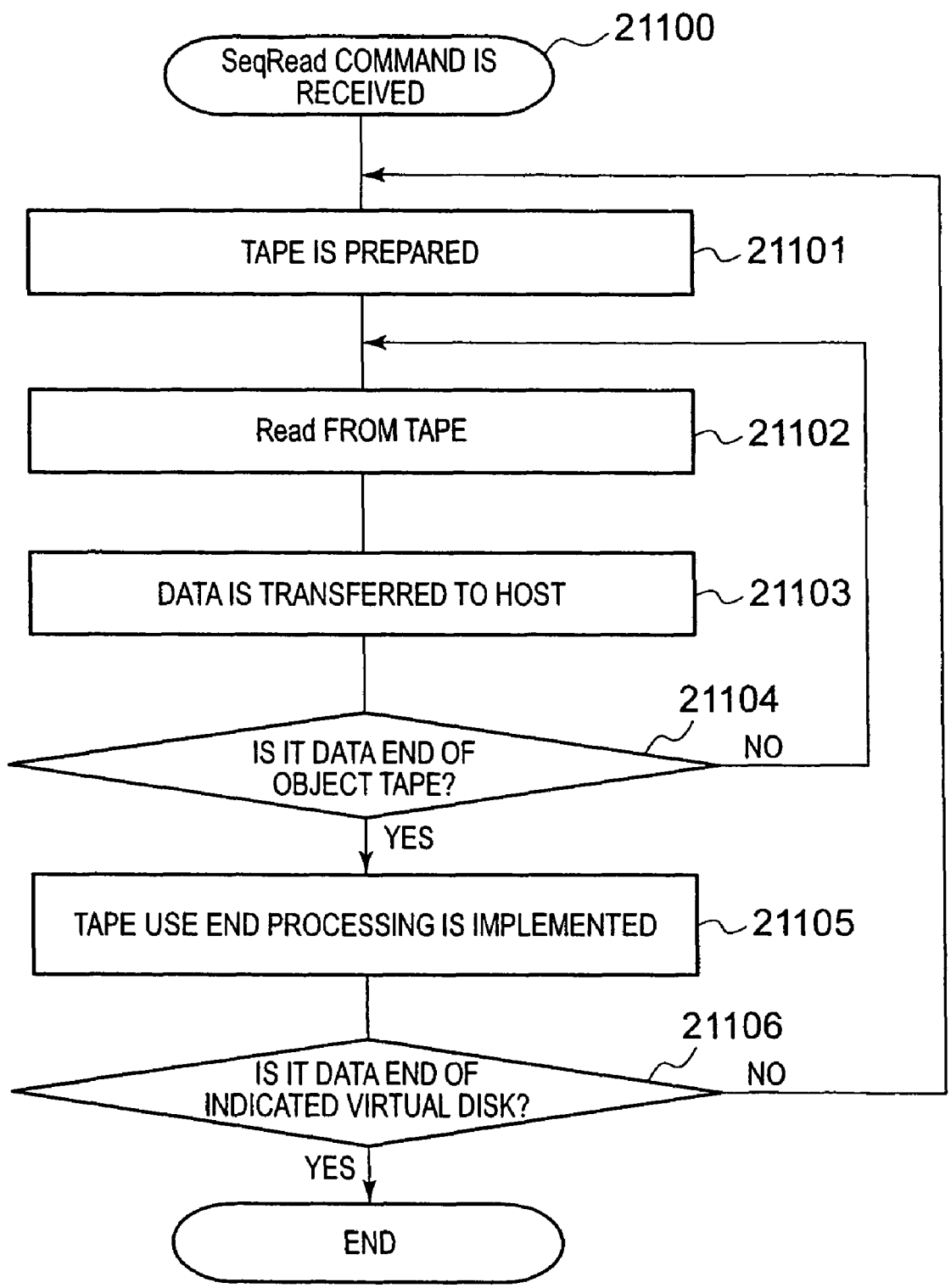
FIG. 39 is a flowchart illustrating an example of the processing performed when the virtual disk array controller 107 received SeqRead Command.

FIG. 39 shows a flowchart illustrating a processing flow performed when the virtual disk array controller 107 receives a SeqRead Command.

When the virtual disk array controller 107 receives a SeqRead Command (step 21100), it changes the virtual disk status of the virtual disk (referred to hereinbelow as "indicated virtual disk") 108 indicated by the SeqRead Command to "SR-prepare" and prepares a tape (referred to hereinbelow as "object tape") 112 corresponding to the indicated virtual disk 108 in the tape drive 111 (step 21101).

Once the object tape 112 is prepared in the tape drive 111, the virtual disk array controller 107 changes the virtual disk status of the indicated virtual disk 108 to "SeqRead" and reads data from the prepared object tape 112 to the cache memory 309 (step 21102).

After the SeqRead Command is issued, the disk array controller 103 periodically monitors the virtual disk status of the indicated virtual disk 108 and issues a Read Command to the indicated virtual disk when the virtual disk status is detected to become "SeqRead". In accordance with this Read Command, the virtual disk array controller 107 transfers the data that are read on the cache memory 309 to the disk array controller 103 (step 21103).

When the data that have to be read remain in the object tape 112, (NO in step 21104), the virtual disk array controller 107 continues reading from the object tape 112, and when the data that have to be read do not remain (YES in step 21104), the controller ends reading the object tape 112.

When the reading from the object tape 112 ends, the virtual disk array controller 107 implements a tape use end processing such as tape rewinding or unloading (step 21105).

When all the data from the indicated virtual disk 108 are read (YES in step 21106), the processing ends. In the case where data are stored in a plurality of object tapes 112, the processing can return to step 21101 and, if necessary, the object tape 112 can be switched and reading can be continued. The virtual disk array controller 107 can also change the read rate from the object tape 112 according to the Read Command from the disk array controller so that the data that are read out do not overflow from the cache memory 309. Furthermore, in the case where the disk LU is allocated, writing to the disk may be performed in parallel with reading to the disk array controller. Furthermore, because the data transfer rate to the disk array controller is higher than the read rate from the object tape 112, when no data was prepared in the cache memory 309, the virtual disk array controller 107 can notify the disk array controller 103 to the effect that data is being prepared. The disk array controller 103 that received the notification that data is being be prepared, can retry the Read Command after a certain interval.

Figure 40:
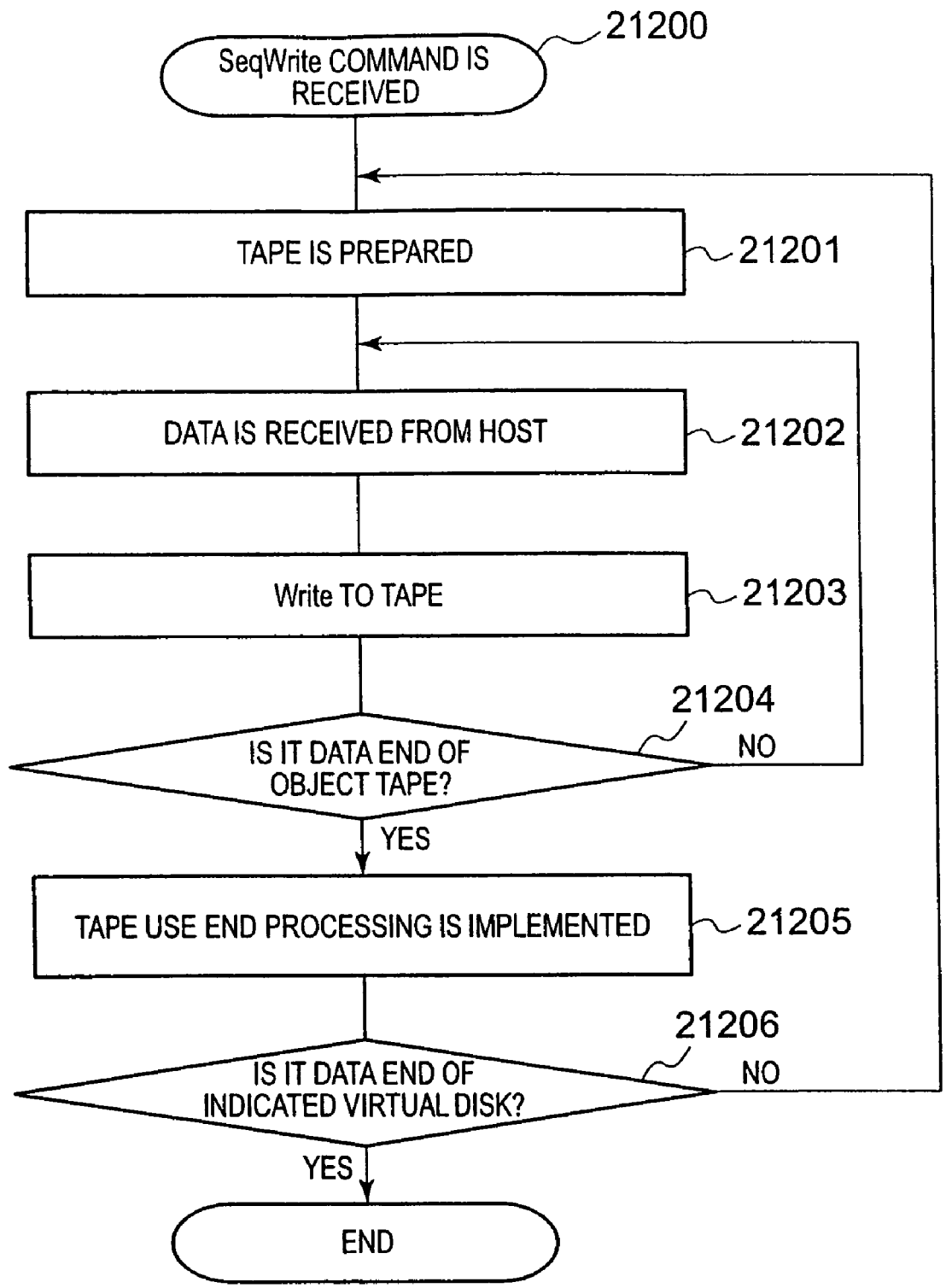
FIG. 40 is a flowchart illustrating an example of the processing performed when the virtual disk array controller 107 received SeqRead Command.

FIG. 40 is a flowchart illustrating an example of processing flow implemented when the virtual disk array controller 107 receives a SeqWrite Command.

When the virtual disk array controller 107 receives a SeqWrite Command (step 21200), it changes the virtual disk status of the virtual disk (referred to hereinbelow as "indicated virtual disk") 108 indicated by the SeqWrite Command to "SW-prepare" and prepares a tape (referred to hereinbelow as "object tape") 112 corresponding to the indicated virtual disk 108 in the tape drive 111 (step 21201).

Once the object tape 112 is prepared in the tape drive 111, the virtual disk array controller 107 changes the virtual disk status of the indicated virtual disk 108 to "SeqWrite". After the SeqWrite Command is issued, the disk array controller 103 periodically monitors the virtual disk status of the indicated virtual disk 108 and issues a Write Command and data to the indicated virtual disk when the virtual disk status is detected to become "SeqWrite". In accordance with this Write Command from the disk array controller 103, the virtual disk array controller 107 writes data from the disk array controller 103 to the cache memory 309 (step 21202). The virtual disk array controller 107 writes the data that are written to the cache memory 309 into the prepared object tape 112 (step 21203).

When the data that are to be written remain in the cache memory 309, (NO in step 21204), the virtual disk array controller 107 continues writing to the object tape 112, and when the data that have to be written do not remain (YES in step 21204), the controller ends writing to the object tape 112.

When the writing to the object tape 112 ends, the virtual disk array controller 107 implements a tape use end processing such as tape rewinding or unloading (step 21205).

When the writing of data to the indicated virtual disk 108 is completed (YES in step 21106), the processing ends. In the case where data are written to a plurality of object tapes 112, the processing can return to step 21201 and, if necessary, the object tape 112 can be switched and writing can be continued. Similarly to the SeqRead Command, in the case where the disk LU is allocated, writing to the disk may be performed in parallel with writing to the disk array controller.

Embodiment 3

The third embodiment of the present invention will be described below. Mainly the differences between this embodiment and the second embodiment will be explained.

Figure 31:
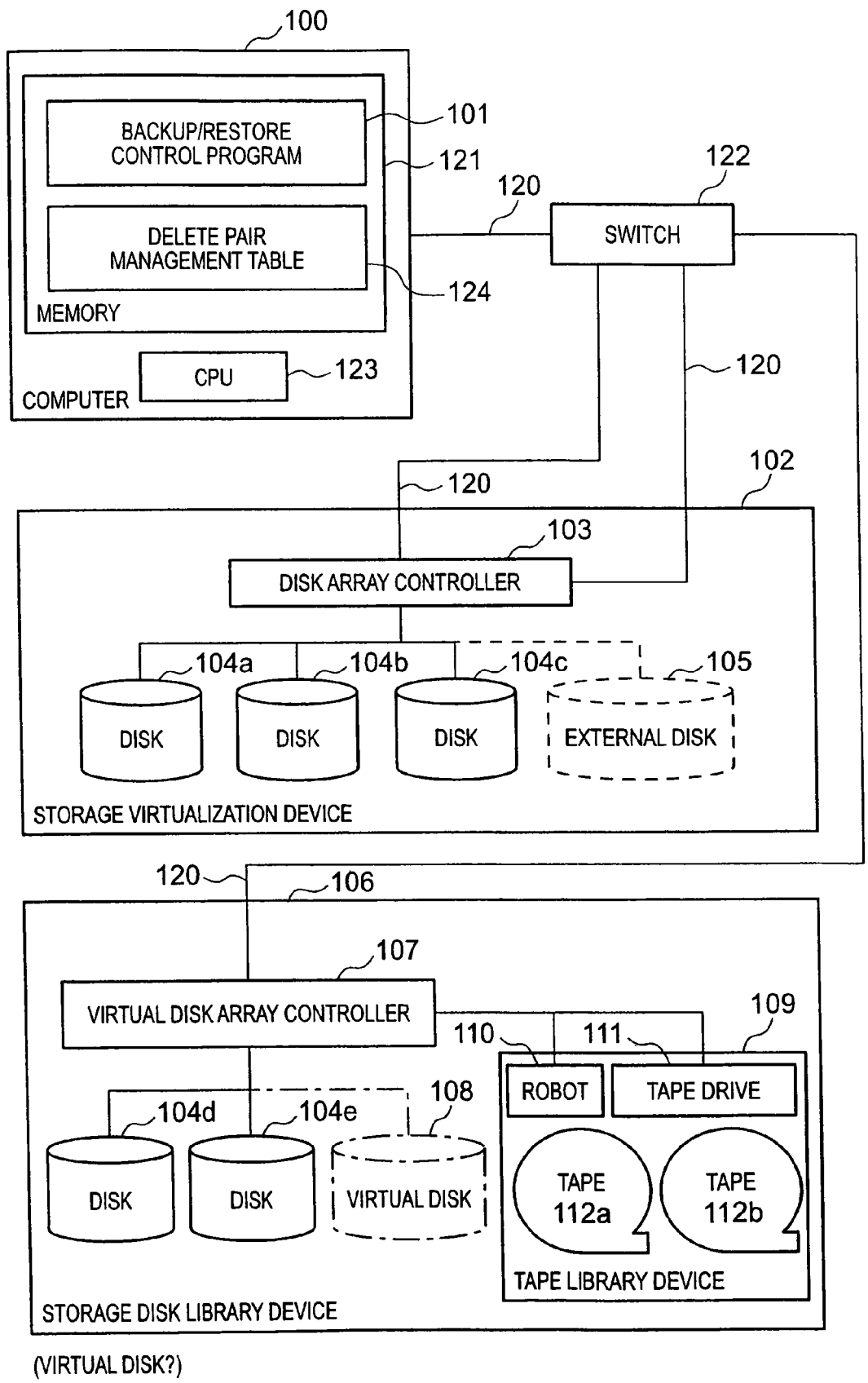
FIG. 31 illustrates a configuration example of a computer system of the third embodiment of the present invention.

FIG. 31 is a configuration example of the computer system of the third embodiment of the present invention.

In the storage virtualization device 102, because the storage resource of various types such as local memory 204 are limited, pairs in excess of the manageable number of pairs are impossible to create. Accordingly, in the third embodiment, when a Delete Command for deleting pair information is provided and the pairs in excess of the savable number of pairs are created, a save space can be freed by executing the Delete Command.

At this time, for example, when the data on the primary LU of the deleted pairs is saved for restoring, the manager has to manage this pair information, but when the number of pairs to be deleted is large, this management becomes troublesome for the manager and it sometimes becomes impossible to establish which LU has to be paired with which LU and how.

For this reason, in the third embodiment, a delete pair management table 124 is prepared and the pair information on the deleted pair (referred to hereinbelow as delete pair information) can be managed with this table. The delete pair management table 124, for example, as shown in FIG. 31, is saved in the memory 121 of the computer 100. When the backup/restore control program 101 issues a Pair Delete Indication, the pair information is stored in the delete pair management table 124. The backup/restore control program 101 provided to the manager a Delete Pair Display Command for outputting the information of the delete pair management table 124 to the display (for example, a display (not shown in the figure) of the computer 2). The manager can display the delete pair information by executing the Delete pair Display Command.

Figure 32:
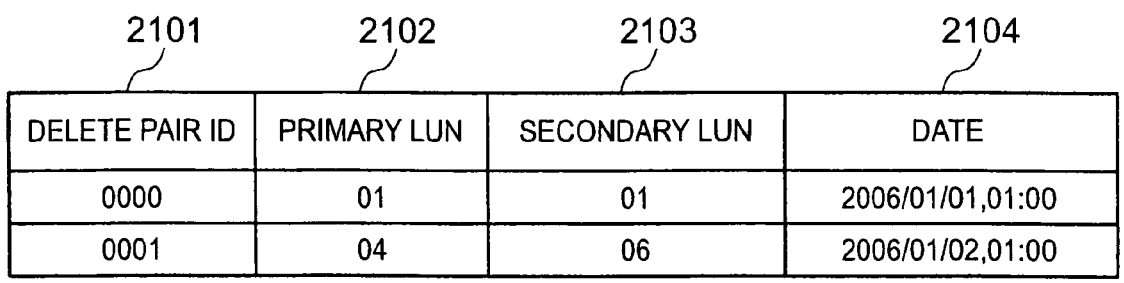
FIG. 32 illustrates a configuration example of the delete pair management table 124.

FIG. 32 illustrates a configuration example of the delete pair management table 124.

The delete pair management table 124 comprises a field 2101 for writing a pair ID, a field 2102 for writing a primary LUN, a field 2103 for writing a secondary LUN, and a field 2104 for writing the date when the deletion was made. Thus, the primary LUN and secondary LUN in the deleted pair information, the delete pair ID for discriminating the deletion of a pair, and the data when the pair information was deleted are recorded as the delete pair information in the delete pair management table 124.

Figure 33:
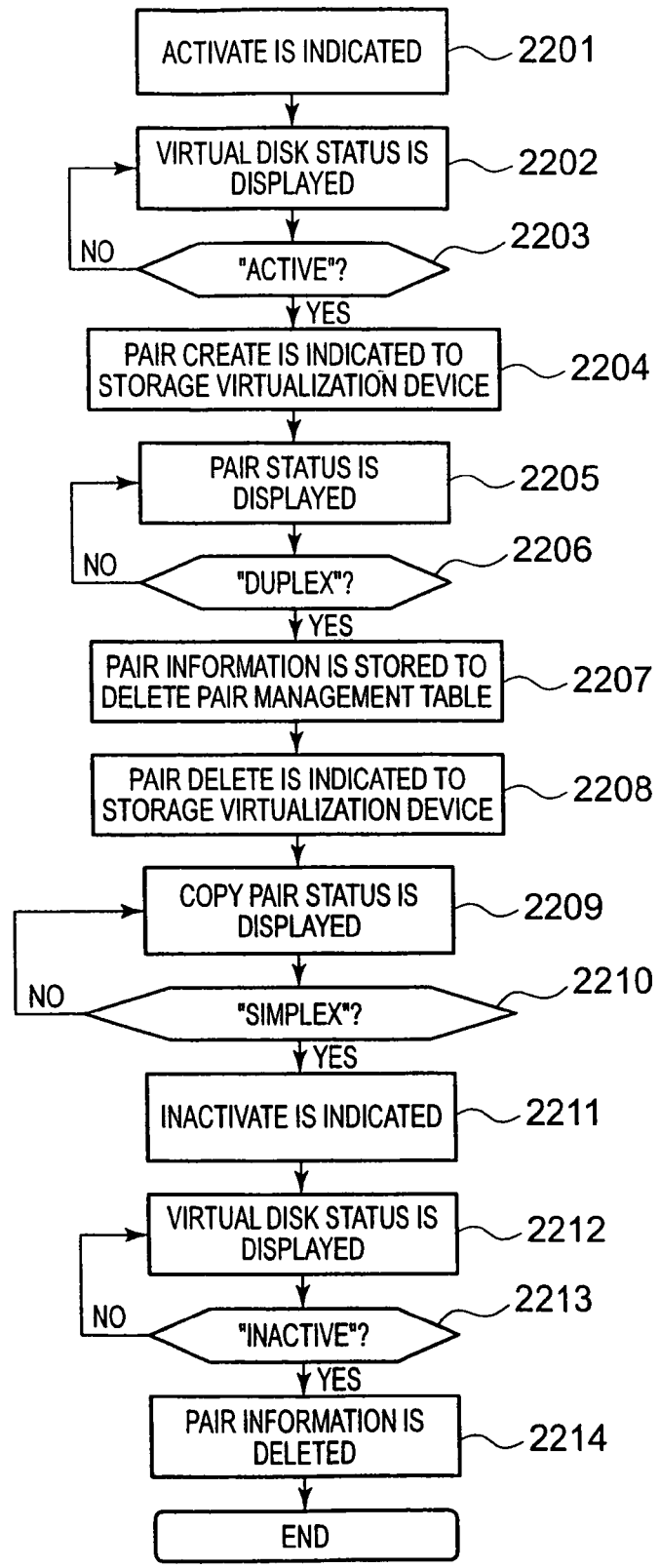
FIG. 33 illustrates an example of a processing flow performed by the backup/restore control program 101 in the backup processing of the third embodiment.

FIG. 33 is an example of a processing flow performed by the backup/restore control program 101 in the backup processing of the third embodiment.

According to FIG. 33, the flow shown in FIG. 25 additionally includes step 2207 of storing the delete pair information in the delete pair management table 124 and a step 2214 of indicating the deletion of the pair information.

In step 2207, the backup/restore control program 101 stores the acquisition time, the primary LUN and secondary LUN of the pair that will be deleted, and a newly allocated delete pair ID in the delete pair management table 124.

If the status received by the backup/restore control program 101 as the return value of the Status Display Command is "Inactive" in step 2213, then in step 2214, the backup/restore control program 101 indicates the pair ID for deleting pair information and issues a Delete Command to the disk control program 205. As a result, the pair information is deleted from the disk control management table 206 by the disk control program 205. When the deletion of pair information ends, the backup processing is completed.

The deletion of pair information may be also performed by pair delete processing. More specifically, step 2214 is not added and pair information is deleted instead of setting "Simplex" in step 1501 shown in FIG. 27. In this case, the disk control program 205 that received the Pair Status Display Command returns "Simplex" to the backup/restore control program 101 when the pair ID indicated by the Pair Status Display Command is not present in the disk control management table 206.

Embodiment 4

The fourth embodiment for the present invention will be example below.

Figure 35:
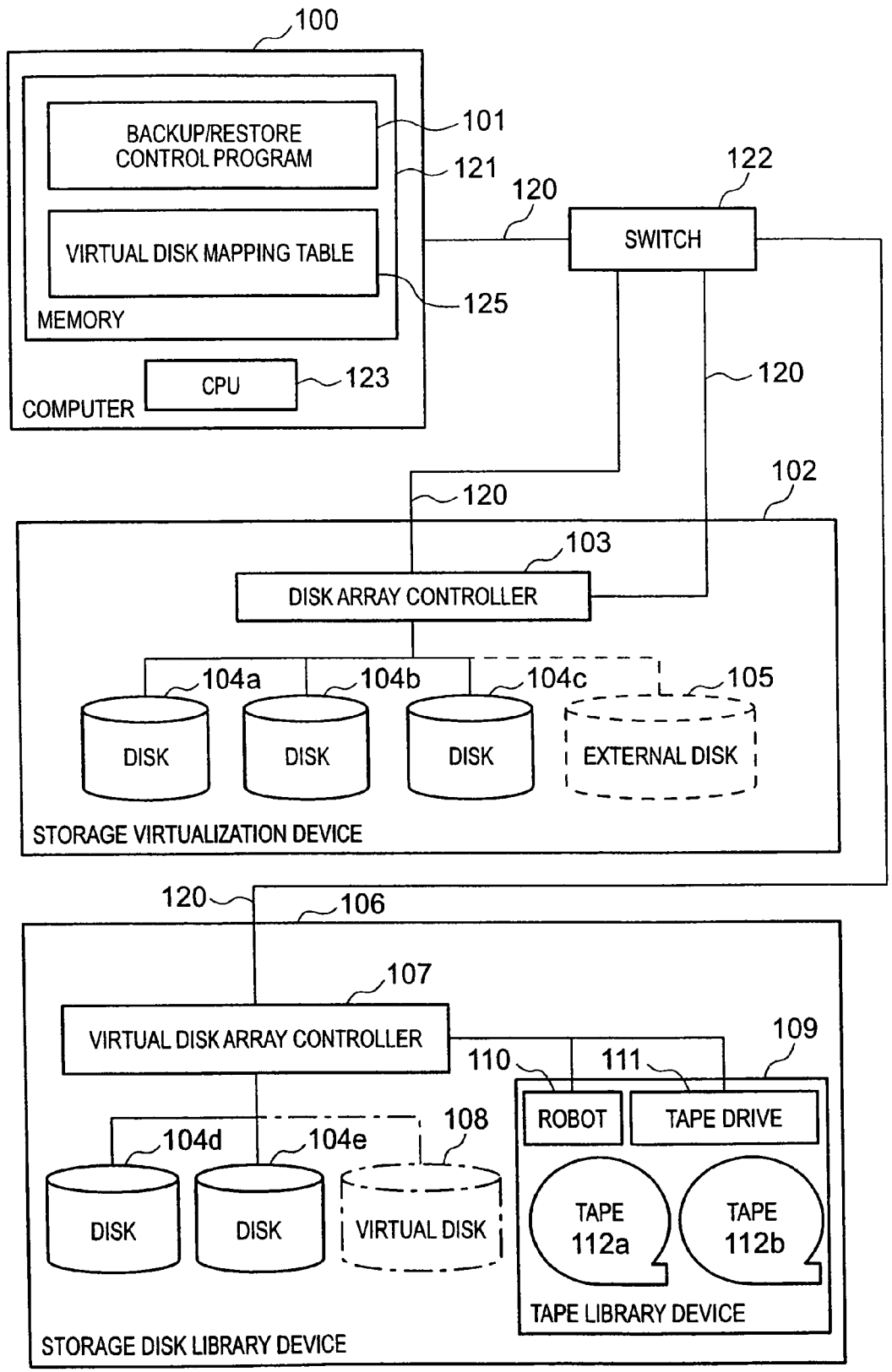
FIG. 35 illustrates a configuration example of a computer system of the fourth embodiment of the present invention.

FIG. 35 illustrates a configuration example of the computer system of the fourth embodiment of the present invention.

In the external disk mapping table 209, external disk in excess of the manageable number of external disks 105 are impossible to create. This is because the storage resources such as local memory 204 are limited.

Accordingly, in the fourth embodiment, when external disks in excess of the manageable number of external disks are be created, a save space of the external disk mapping table 209 can be freed by executing an External Disk release Command that deletes the mapping of the external disk 105.

At this time, for example, when the correspondence relationship of the deleted external disk 105 and virtual disk 108 is saved for restoring, the manager has to manage this correspondence relationship, but when the number of external disks is large, this management becomes troublesome for the manager and it sometimes becomes impossible to establish which external disk 105 and which virtual disk 108 are mapped.

For this reason, in the fourth embodiment, the backup/restore control program 101 manages the correspondence relationship of the deleted external disk 105 and virtual disk 108 by using the virtual disk mapping table 125 shown in FIG. 35. When an External Disk release Indication is issued, the backup/restore control program 101 stores the correspondence relationship in the virtual disk mapping table 125. The backup/restore control program 101 provides to the manager a Virtual Disk Mapping Table Display Command for outputting the information of the virtual disk mapping table 125 to a display (for example, a display (not shown in the figure) of the computer 100). The manager can display the correspondence relationship of the virtual disks and external disks by executing the Virtual Disk Mapping Table Display Command.

Figures 36, 37:
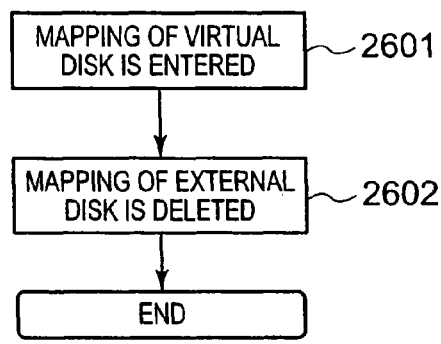
FIG. 36 illustrates a configuration example of the virtual disk mapping table 125.
FIG. 37 is a flowchart illustrating an example of a delete processing flow of the external disk 105.

FIG. 36 illustrates a configuration example of the virtual disk mapping table 125.

The virtual disk mapping table 125 comprises a field 2501 for writing a mapping ID, a field 2302 for writing an external LUN, a field 401 for writing a virtual disk LUN, a field 1102 for writing a primary LUN, a field 1103 for writing a secondary LUN, and a field 2502 for writing the date. The mapping ID is an ID for uniquely identifying the correspondence relationship of the virtual disk 108 and external disk 105. The date is a date when the External Disk Release Indication was issued.

FIG. 37 is a flowchart illustrating an example of a delete processing flow of the external disk 105.

In step 2601, the backup/restore control program 101 stores a newly allocated mapping ID, a LUN of the external disk 105 that will be deleted, a LUN of the virtual disk 108 that is in a correspondence relationship with the external disk 105, the respective LUN of the primary LU and secondary LU to which this external disk 105 was related, and the date of acquisition by the computer 100 in the virtual disk mapping table 125.

In step 2602, the backup/restore control program 101 sends an External Disk Release Command including the external disk LUN to the disk control program 205. The disk control program 205 that received the External Disk release Command deletes the information corresponding to the external disk LUN in this command (mapping ID, external disk LUN, and virtual disk LUN) from the external disk mapping table 209. When the release of the external disk 105 ends, the external disk release processing is completed.

Several preferred embodiments of the present invention were described above, but they were illustrating examples serving to illustrate the present invention, and the scope of the present invention should not be construed as limited to those embodiments. The present invention can be also implemented in a variety of other modes.

For example, the virtual disk 108 may be fixedly mapped with the disk LU 12, without being mapped with the tape LU 142. In other words, a plurality of disk LU 141 may include a disk LU 141 that is fixedly mapped with the virtual disk 108 and a disk LU 141 that is dynamically mapped with the virtual disk 108. As a result, both the tape access using a disk cache and a disk access that creates no tape access can be performed in one virtual disk library device 106.

Furthermore, the present invention is not limited to disk cache and, for example, a variety of storage spaces that can be associated with random access, for example, a storage space reserved on a memory (for example, a flash memory) may be used.

What is claimed is:

1. A computer system comprising:
   a plurality of tape media for storing data;
   a first storage device configured to perform random access that is an access with randomly different access destinations at a rate higher than the tape media;
   a virtual storage device that emulates said first storage device;
   a second controller for controlling access to said plurality of tape media and said first storage device;
   a second storage device for storing data;
   a third storage device having said virtual storage device mapped therewith; and
   a first controller for controlling data access to said second storage device or said third storage device, said first controller including an internal memory stored with a disk control program for performing storage device pair copying and deleting and a pair management table for recording storage device pairing copying and deleting as preformed,
   wherein said first controller receives a Copy Indication, checks if said virtual storage device is active, if said virtual storage device is active then performs data copying from said third storage device to said second storage device in response to said Copy Indication and, at this time, sends a Data Access Command indicating said virtual storage device for data access generated in said third storage device, and displays a pair duplex status of said third storage device and said second storage device,
   said second controller reserves a storage space on said first storage device, reads data from an object tape medium, which is a tape medium corresponding to said virtual storage device, of said plurality of tape media, to said storage space, and when a Data Access Command relating to said virtual storage device is received, performs data access to said storage space, rather than to said object tape medium, and after said first controller receives the Delete Indication, even if there is an update in said third storage device, said first controller does not manage a difference between said third storage device and said second storage device that originated due to said update and then, when said Copy Indication is received, sends said Write Command for writing all the data located in the third storage device after the update to said second storage device, and displays a pair simplex status of said third storage device and said second storage device.

2. The computer system according to claim 1, wherein said first controller performs data copying from said third storage device to said second storage device in response to said Copy Indication and, at this time, sends a Write Command that indicates said virtual storage device for writing generated in said second storage device; and
   said second controller receives the Write Command relating to said virtual storage device, performs writing into said storage space, rather than into said object tape medium, and when said writing is completed, writes data present on said storage space into said storage tape medium.

3. The computer system according to claim 2, wherein after said first controller receives the Split Indication, if there is an update in said third storage device, said first controller manages a difference between said third storage device and said second storage device that originated due to said update and then, when said Copy Indication is received, sends said Write Command for writing only said managed difference into said second storage device.

4. The computer system according to claim 1, wherein after displaying a pair simplex status of said third storage device and said second storage device, said first controller issues an Inactivate Indication including a LUN of the virtual disk and displays a Virtual Disk Status as "Inactive" if so determined.

5. The computer system according to claim 1, wherein said first controller performs data copying from said third storage device to said second storage device in response to said Copy Indication and, at this time, sends a Read Command that indicates said virtual storage device for reading from said third storage device, and writes data that are read out in response to the Read Command to said second storage device; and
   said second controller receives the Read Command relating to said virtual storage device, reads data from said storage space, rather than from said object tape medium, and sends the read-out data to said first storage system.

6. The computer system according to claim 5, wherein after said first controller receives the Split Indication, if there is an update in said third storage device, said first controller manages a difference between said third storage device and said second storage device that originated due to said update and then, when said Copy Indication is received, sends said Read Command for reading only said managed difference into said second storage device.

7. The computer system according to claim 4, wherein after displaying the Virtual Disk Status as "Inactive", said first controller executes backup processing.

8. The computer system according to claim 1, wherein there is an upper limit for the number of pair information that is recorded in the pair management table.

9. The computer system according to claim 1, wherein a plurality of third/virtual sets, each of which is a set of said third storage device and said virtual storage device, are provided, and each third/virtual set can be deleted;
   said first controller records set/delete information relating to said third/virtual set in the pair management table; and
   there is an upper limit for the number of set information that is recorded in the pair management table.

10. The computer system according to claim 1, wherein said virtual storage device is provided in a plurality;
    a tape LU that is a logical storage unit is mapped with each of said plurality of virtual storage devices;
    when, in a tape medium having the end of an object tape LU mapped with an object virtual storage device, there is present a tape LU different therefrom, said second controller reads data into said storage space from at least two tape LU including said object tape LU and said different tape LU; and
    in a tape medium having the ends of said at least two tape LU, data of other tape LU are not present beyond the ends.

11. The computer system according to claim 1, wherein said second controller receives a predetermined Prepare Indication corresponding to said virtual storage device and reserves said storage space in response to said Prepare Indication.

12. The computer system according to claim 1, wherein said first controller sends a predetermined Prepare Indication corresponding to said virtual storage device to said second controller prior to said data copying; and
    said second controller receives said Prepare Indication from said first controller and reserves said storage space in response to said Prepare Indication.

13. The computer system according to claim 1, wherein said second controller receives a predetermined End Indication corresponding to said virtual storage device and writes data located on said storage space into said object tape medium in response to said End Indication.

14. The computer system according to claim 1, wherein said first controller sends a predetermined End Indication corresponding to said virtual storage device said second controller after said data copying; and
   said second controller receives said End Indication from said first controller and writes data located on said storage space into said object tape medium in response to said End Indication.

15. The computer system according to claim 1, wherein said second controller reserves a disk space that is released and releases said reserved disk space when a prescribed event occurs.

16. The computer system according to claim 1, wherein when data that are a read object from said object tape medium are already present in said reserved disk space, said second controller does not read data from said object tape medium into said disk space.

17. The computer system according to claim 1, wherein when data access indicating said virtual disk device is the first access, said second controller does not read data from said object tape medium into said disk space.

18. The computer system according to claim 1, wherein at least two tape LU that are logical storage units are prepared in said plurality of tape media;
   said virtual storage device is provided in a plurality and each of said at least two tape LU is mapped with each of said plurality of virtual storage devices;
   at least two storage LU that are logical storage units are prepared in said first storage device; and
      said second controller accepts a predetermined Prepare Indication corresponding to each virtual storage device from a higher-level device that is at least one of said computer and said first storage device and, when receiving the Prepare Indication, reserves at least one storage LU that is released with a storage capacity equal to or larger than an object tape LU that is mapped with the indicated virtual storage device that is indicated by the Prepare Indication, reads data from said object tape LU to said reserved at least one storage LU, accepts a predetermined End Indication corresponding to said indicated virtual storage device from the higher-level device, and when receiving the End Indication, writes data located on said at least one reserved storage LU into said object tape LU and releases said at least one storage LU.

19. A storage control method implemented in a computer system comprising a plurality of tape media for storing data, a first storage device configured to perform random access that is an access with randomly different access destinations at a rate higher than the tape media, a virtual storage device that emulates said first storage device, a second controller for controlling access to said plurality of tape media and said first storage device, a second storage device for storing data, a third storage device having said virtual storage device mapped therewith, and a first controller for controlling data access to said second storage device or said third storage device, the method comprising:
   storing in an internal memory of said first controller a disk control program for performing storage device pair copying and deleting and a pair management table for recording storage device pairing copying and deleting as preformed;
   by said first controller, receiving a Copy Indication, checking if said virtual storage device is active, if said virtual storage device is active then performing data copying from said third storage device to said second storage device in response to said Copy Indication and, at this time, sending a Data Access Command indicating said virtual storage device for data access generated in said third storage device, and displaying a pair duplex status of said third storage device and said second storage device;
   by said second controller, reserving a storage space on said first storage device, reading data from an object tape medium, which is a tape medium corresponding to said virtual storage device, of said plurality of tape media, to said storage space, and when a Data Access Command relating to said virtual storage device is received, performing data access to said storage space, rather than to said object tape medium; and
   after receiving the Delete Indication, even if there is an update in said third storage device, not managing by said first controller a difference between said third storage device and said second storage device that originated due to said update and then, when said Copy Indication is received, sending said Write Command for writing all the data located in the third storage device after the update by said first controller to said second storage device, and displaying a pair simplex status of said third storage device and said second storage device.

* * * * *